(12) United States Patent
Kami

(10) Patent No.: US 8,667,488 B2
(45) Date of Patent: Mar. 4, 2014

(54) HIERARCHICAL SYSTEM, AND ITS MANAGEMENT METHOD AND PROGRAM

(75) Inventor: Nobuharu Kami, Tokyo (JP)

(73) Assignee: NEC Corporation, Tokyo (JP)

( * ) Notice: Subject to any disclaimer, the term of this patent is extended or adjusted under 35 U.S.C. 154(b) by 1084 days.

(21) Appl. No.: 12/282,812

(22) PCT Filed: Mar. 12, 2007

(86) PCT No.: PCT/JP2007/054772
§ 371 (c)(1),
(2), (4) Date: Sep. 12, 2008

(87) PCT Pub. No.: WO2007/119329
PCT Pub. Date: Oct. 25, 2007

(65) Prior Publication Data
US 2009/0100248 A1    Apr. 16, 2009

(30) Foreign Application Priority Data

Mar. 14, 2006  (JP) ................... 2006-069559

(51) Int. Cl.
*G06F 9/455* (2006.01)
(52) U.S. Cl.
USPC .......................................................... 718/1
(58) Field of Classification Search
None
See application file for complete search history.

(56) References Cited

U.S. PATENT DOCUMENTS

2005/0038789 A1*  2/2005  Chidambaran et al. ......... 707/10
2005/0038829 A1*  2/2005  Chidambaran et al. ....... 707/200
2005/0188088 A1    8/2005  Fellenstein et al.
2006/0294238 A1* 12/2006  Naik et al. ..................... 709/226
2008/0256241 A1* 10/2008  Graser et al. .................. 709/226

FOREIGN PATENT DOCUMENTS

WO    WO 2005/01397 A1    2/2005
WO    WO 2005/015398 A1   2/2005

OTHER PUBLICATIONS

Barham, P. et al., "Xen and the Art of Virtualization", Proc. SOSP 2003, Bolton Landing, New York, U.S.A., Oct. 19-22, 2003.
User Mode Linux, retrieved Sep. 14, 2005 from: http://user-mode-linux.sourceforge.net/.
VMware's web site, http://www.vmware.com/.
Bochs, http://bochs.sourcefore.net/.
Virtual PC, http://www.microsoft.com/japan.windows/virtualpc/default.mspx.
Office Action dated Jun. 20, 2012 received from the Japanese Patent Office in related case, namely, JP 2008-510760.

* cited by examiner

*Primary Examiner* — Emerson Puente
*Assistant Examiner* — Dong Kim
(74) *Attorney, Agent, or Firm* — Scully Scott Murphy & Presser PC

(57) ABSTRACT

A lower system structure reports performance information to an upper system structure. When detecting performance deterioration of the system structure on the basis of the reported performance information, the upper system structure optimizes resource redistribution of the system structure that the upper system structure manages. If the performance is improved by the optimization in the managed system structure, the optimization results is applied to the resource control of the lower system structure, and the lower system structure redistributes the resources according to the resource control. If the performance is not improved by the optimization, the lower system structure reports the performance information to the upper system structure, which optimizes the resource redistribution.

16 Claims, 10 Drawing Sheets

HIERARCHICAL SYSTEM, AND ITS MANAGEMENT METHOD AND PROGRAM

TECHNICAL FIELD

The present invention relates to a hierarchical system, and its management method and program, and particularly, to a hierarchical system, and its management method and program for conducting resource management of a hierarchical system having a system structure arranged in a tree structure.

BACKGROUND ART

Conventional computers or network systems have discrete computer machines or network machines installed with required software for defining hardware's functions. They have such hardware and software resources in combination to constitute a so-called silo type system, as shown in FIG. 1.

This method, however, poses a problem that some resources executing certain applications are highly loaded, whereas many other resources have a very low utilization rate, resulting in poor resource utilization efficiency as a whole relative to the total amount of committed resources. Thus, there has been proposed a virtualization technique with which resources are logically virtualized and apparently possessed resources are put into a pool so that a system that needs the resources can use them as much as needed.

Examples of the virtualization technique include: Xen as disclosed in Non-patent Document 1, UML as disclosed in Non-patent Document 2, VMware as disclosed in Non-patent Document 3, Bochs as disclosed in Non-patent Document 4, and virtual PC as disclosed in Non-patent Document 5; those techniques provide computers required in a system as logical computer machines connected virtual networks to thereby create the same operation environment as that in which discrete computer machines are connected via network machines.

These conventional systems are implemented by a technique of giving one hardware resource an appearance of a plurality of independent apparatuses as if they were actually present as viewed from user processes. Taking the Xen architecture as disclosed in Non-patent Document 1 as a representative example, it is comprised of hardware resources 11, virtualization means 12, virtual apparatuses 13, virtual networks 14, guest operating systems 15, and applications 16, as shown in FIG. 2.

The conventional computer system having such a configuration operates as follows:

The virtualization means 12 pertains to a VMM (Virtual Machine Monitor) that is a technique developed for the purpose of allowing a plurality of users to individually use a large-size computer such as, formerly, a mainframe, and has become increasingly applicable to general-purpose computers with recent performance improvement thereof. A conventional mainstream scheme involved running one OS on one computer resource to manage several kinds of devices, and it was difficult to simultaneously run a plurality of OSes.

In contrast, the virtualization means 12 is laid at a layer between the operating systems 15 and hardware resources 11 for virtualizing the hardware resources to give them an appearance of logical resources as viewed from the operating systems 15, thereby achieving the virtualization technique capable of running a plurality of operating systems 15 with one hardware resource. A logical computer machine installed with an operating system 15 running on the virtualization means 12 is referred to as virtual apparatus 13, and the virtualization means 12 has a function of intermediating use of actual hardware resources 11 in response to the requests from the virtual apparatuses 13 to use resources. Thus, it is possible to share one hardware resource among a plurality of operating systems 15, thus improving resource utilization efficiency. Moreover, since it is possible to prescribe the allocation proportion of resources, a prescribed amount of resources can be effectively allocated to the virtual apparatuses. Furthermore, the virtual apparatuses 13 can be mutually connected via the virtualization means 12 using the virtual networks 14 provided by the virtualization means 12.

In a virtual apparatus 13, the application 16 runs on the operating system 15 and issues a request to use resources as in calculation to the operating system 15, which is the same as an ordinary case where the operating system 15 is directly run on the hardware resource 11. The operating system 15 is run so that resources (logical resources) that it manages are shared among a plurality of the applications 16.

The operating system generally has a privileged mode for resource management, and resources that the operating system 15 can manage are logical resources given to it. The privilege for controlling hardware resources is used by the virtualization means 12. Thus, even when codes that are problematic from the security viewpoint are executed in a certain virtual apparatus 13, for example, its effect is confined within the virtual apparatus 13 and does not extend to other virtual apparatuses, thus providing an advantage that protection is secured among the virtual apparatuses. Thus, it is possible to keep a protection level while sharing resources.

By using such a virtualization technique, a plurality of virtual apparatuses can be configured on one physical apparatus and assigned to a plurality of systems, whereby resources can be shared among several departments in one organization, for example, while securing a protection level.

Non-patent Document 1: P. Barham et al., "Xen and the art of virtualization," Proc. SOSP 2003, Bolton Landing, N.Y., U.S.A., Oct. 19-22, 2003.

Non-patent Document 2: User Mode Linux, (see user mode linux web site

Non-patent Document 3: VMware's web site

Non-Patent Document 4: Bochs (see Bochs web site)

Non-patent Document 5: Virtual PC (see Microsoft web site)

DISCLOSURE OF THE INVENTION

Problems to be Solved by the Invention

A first problem is that scalability for the whole system is limited. A reason thereof is that the conventional technique allows allocation of the hardware resources 11 to the virtual apparatuses 13 shown in FIG. 2 only with privileges of the virtualization means 12, and when resource allocation optimization is needed to deal with variation in processing load on the virtual apparatuses 13, the cost thereof exponentially increases for a larger system.

A second problem is that, when a plurality of systems are present, it is difficult to secure independency of management in each system. A reason thereof is that an optimal balance is not achieved between privileges of performance management and resource management by system administrators, and each system administrator cannot perform resource management at his/her discretion for improving performance of a virtual apparatus under his/her management. In general, within a certain organization, there are a plurality of virtual apparatuses that provide several kinds of applications, these apparatuses are combined to construct a system for providing one service, and such services are combined in some cases to construct a system for providing an upper-level service. Administrators of the virtual apparatuses or systems are not always served by one person depending upon the scale of the system, or rather, they are positioned in independent management lines for which privileges and scope of management are separately determined, and in such a case, they do not need to know details of systems of the others. In a conventional system, however, the administrators have no privileges for resource allocation among virtual apparatuses or management systems that they manage, and they must send a request to a general system administrator.

A third problem is that recalculation of resource allocation cannot be efficiently achieved. A reason thereof is that virtual apparatuses and systems have different time scales of variation in the required amount of resources, and this difference is not taken into account in resource allocation calculation.

The present invention has been made in view of such problems, and its object is to provide a system and a technique therefor that are capable of improving resource efficiency by effectively re-distributing resources among a plurality of computers and network systems arranged in hierarchy while keeping independency of their respective management tasks, and reducing the cost of the re-distribution.

Means to Solve the Problem

The 1st invention for solving the above-mentioned problems, which is a hierarchical system characterized in that system structures are arranged to have a tree structure, a lower system structure has performance information reporting means for reporting performance information for the system structure itself to an upper system structure, and the upper system structure has resource optimization processing means for performing optimization processing for resources in the system structures that it manages based on the performance information reported by said lower system structure and resource management information for the system structures that it manages.

The 2nd invention for solving the above-mentioned problems, in the above-mentioned 1st invention, is characterized in that when performance of a system structure is not improved by optimization processing for resources by the resource optimization processing means in said upper system structure, the performance information is reported to a system structure that is upper relative to said upper system structure, and resource optimization processing means in the upper system structure that has received the report performs optimization processing for resources in the system structures that the upper system structure manages.

The 3rd invention for solving the above-mentioned problems, in the above-mentioned 1st or 2nd inventions, is characterized in that said resource optimization processing means has means for creating a representative performance index for the system structure using performance information for the lower system structures, and thereby, referring to performance of the lower system structures from the upper system structure.

The 4th invention for solving the above-mentioned problems, in one of the above-mentioned 1st to 3rd inventions, is characterized in that said resource optimization processing means hides management information for lower system structure from an outside, and each of the system structures in the entire system independently performs optimization processing for resources.

The 5th invention for solving the above-mentioned problems, which is a hierarchical system characterized in that system structures each serving as a management unit are arranged to have a tree structure, each system structure has resource management information interface means for communicating with a parent system structure, performance index interface means, resources, operation management means for performing resource allocation optimization and performance management, resource allocating means for performing resource allocation, and child system structures that it manages, and the parent system structure and child system structure communicate with each other resource information and performance information via said resource management information interface means and said performance index interface means.

The 6th invention for solving the above-mentioned problems, in the above-mentioned 5th invention, is characterized in that said operation management means has resource managing means for performing resource management, resource allocation controlling means for controlling resource allocation, performance monitoring means for monitoring performance of the system structures, and optimization means for performing optimization calculation for a resource allocation method based on resource management information about resources from said resource managing means and performance information from said performance monitoring means, and performs resource allocation optimization based on the performance information and resource management information for the child system structures that it manages.

The 7th invention for solving the above-mentioned problems, in the above-mentioned 5th or 6th inventions, is characterized in that said performance monitoring means is configured to create a representative performance index for the system structure to which said operation management means belongs using acquired performance information for the child system structures, and refer to said representative performance index via the performance index interface means.

The 8th invention for solving the above-mentioned problems, in one of the above-mentioned 5th to 7th inventions, is characterized in that said system structures hide detailed management information for the child system structures therein from an outside, and each of the system structures in the entire system independently performs resource allocation management.

The 9th invention for solving the above-mentioned problems, in one of the above-mentioned 5th to 8th inventions, is characterized in that said resource managing means is configured to update setup of resources with the parent system structure using said resource management information interface means.

The 10th invention for solving the above-mentioned problems, which is a management method for a hierarchical system, characterized in that system structures are arranged to have a tree structure, a lower system structure reports performance information for the system structure itself to an upper system structure, and said upper system structure performs optimization processing for resources in the system structures that it manages based on the performance information reported by said lower system structure and resource management information for the lower system structure that it manages.

The 11th invention for solving the above-mentioned problems, in one of the above-mentioned 10th invention, is characterized in that when performance of a system structure is not improved by optimization processing for resources by the upper system structure, performance information is reported from said upper system structure to a system structure that is still upper, and the upper system structure that has received the report performs optimization processing for resources in the system structures that the upper system structure manages.

The 12th invention for solving the above-mentioned problems, in the above-mentioned 10th or 11th inventions, is characterized in that a representative performance index for the managed system structure is created using the reported performance information, and performance of the lower system structure is referred to from the upper system structure.

The 13th invention for solving the above-mentioned problems, in one of the above-mentioned 10th to 12th inventions, is characterized in that the upper system structure hides management information for a lower system structure that it manages from an outside, and each of the system structures independently performs optimization processing for resources.

The 14th invention for solving the above-mentioned problems, which is a program for executing resource management for a hierarchical system in which system structures are arranged to have a tree structure, characterized in that said program causes an information processing apparatus to execute: processing for reporting performance information for the system structure itself from a lower system structure to an upper system structure; and processing in which said upper system structure performs optimization processing for resources in the system structures that it manages based on the performance information reported by said lower system structure and resource management information for the lower system structure that it manages.

The 15th invention for solving the above-mentioned problems, in the above-mentioned 14th invention, is characterized in that said program causes the information processing apparatus to execute: processing for, when performance of a system structure is not improved by optimization processing for resources by the upper system structure, reporting performance information from said upper system structure to a system structure that is still upper; and processing in which the upper system structure that has received the report performs optimization processing for resources in the system structures that said upper system structure manages.

The 16th invention for solving the above-mentioned problems, in the above-mentioned 14th or 15th inventions, is characterized in that said program causes the information processing apparatus to execute: processing for creating a representative performance index for the managed system structure using the reported performance information; and processing for referring to said representative performance index in response to a request from the upper system structure.

Effects of the Invention

A first effect of the present invention is that scalability of the whole system can be improved. A reason thereof is that the present invention reduces the cost of optimization calculation for resource reallocation upon load variation in the virtual apparatuses and system.

A second effect of the present invention is that independency can be secured in management of a plurality of systems. A reason thereof is that the present invention is configured to provide administrators with resource allocation control privileges within their respective management systems. Another reason is that operation management is allowed while hiding details of the systems that other administrators take charge of.

A third effect of the present invention is that efficiency in resource allocation can be improved. The reason thereof is that optimization calculation can be independently achieved by administrators of the systems that are made hierarchical, and a technique taking account of the time scale of variation thereof is provided.

EXPLANATION OF SYMBOLS

Figure 1:
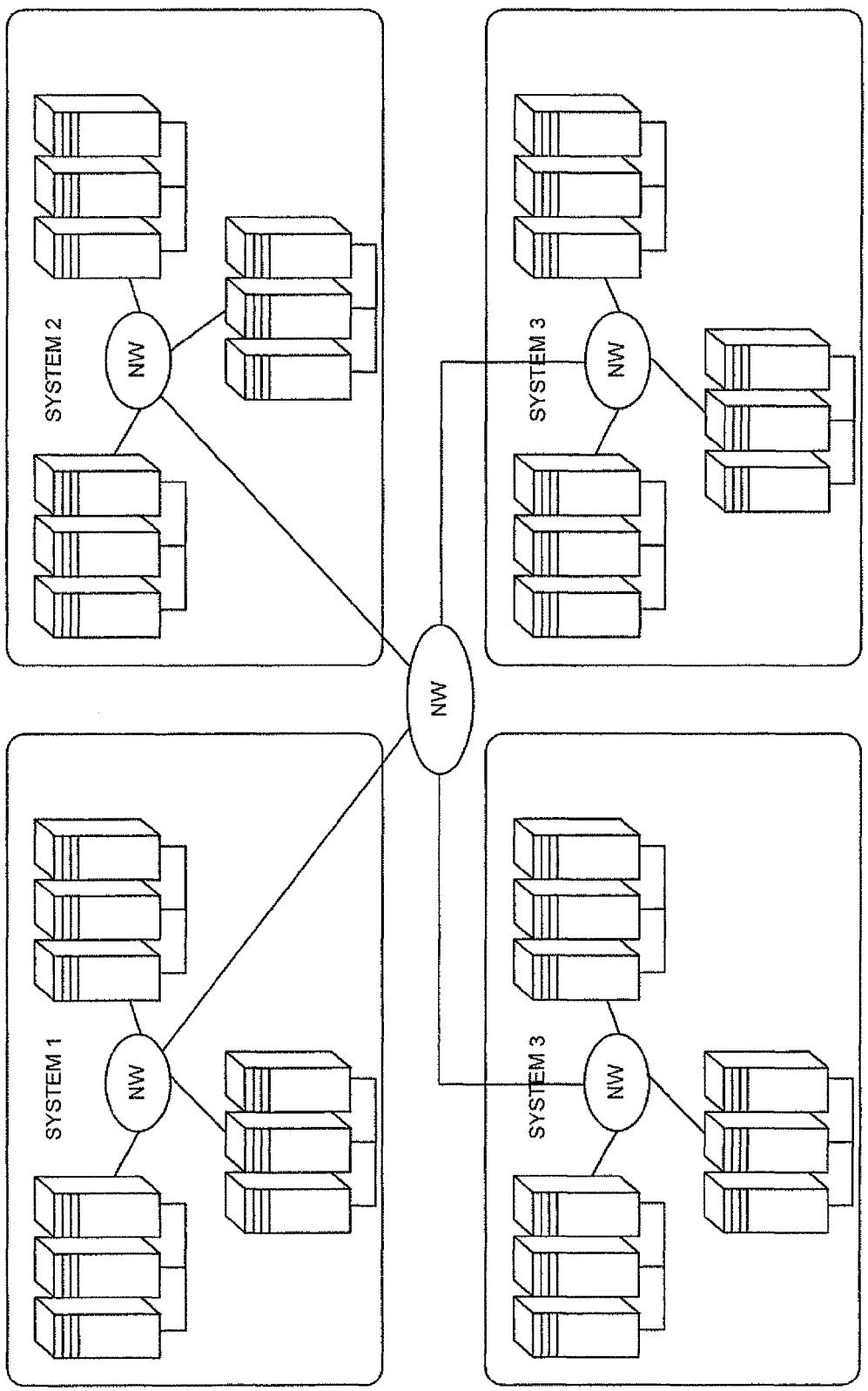
FIG. 1 is a diagram for explaining a conventional technique.
Figure 2:
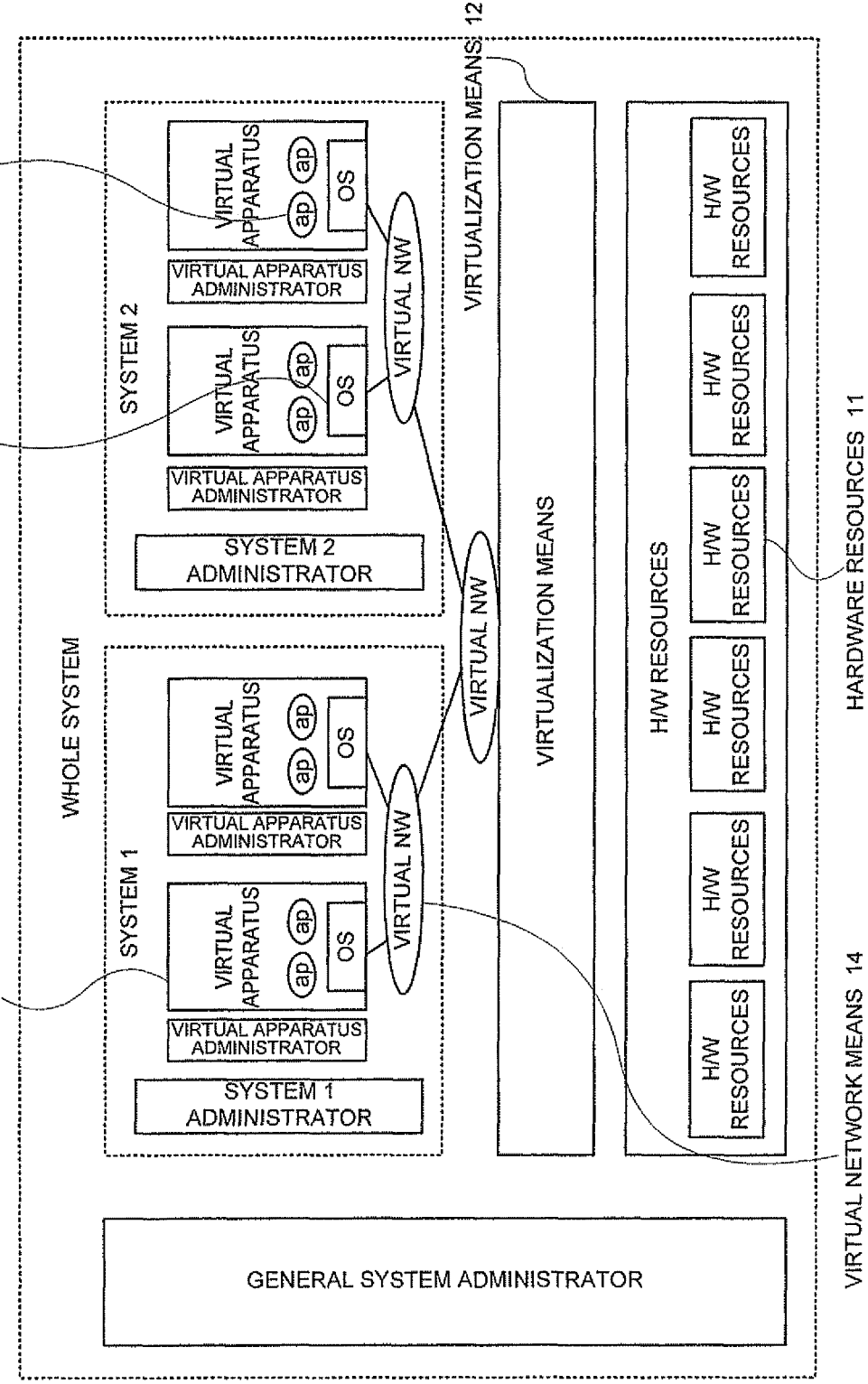
FIG. 2 is a diagram for explaining the conventional technique.

200 System structure
201 Performance index interface means
202 Resource management information interface means
211 System structure group
220 Resource space
221 Resource allocating means
222 Resource allocation controlling means
223 Resource managing means
224 Performance monitoring means
225 Performance managing means
226 Optimization calculation means
230 Resources

BEST MODES FOR CARRYING OUT THE INVENTION

Now, a hierarchical system of the present invention will be described.

Figure 8:
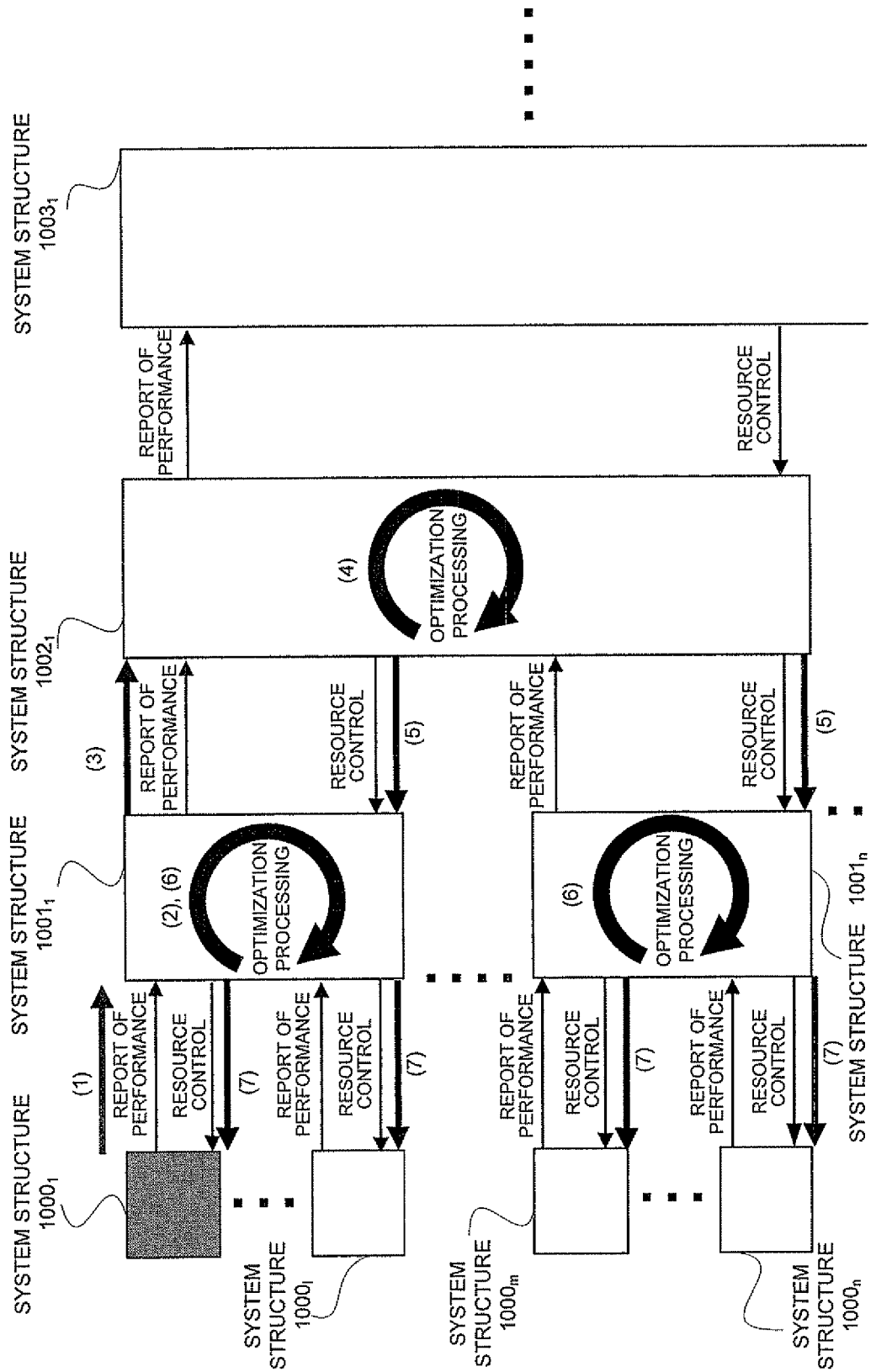
FIG. 8 is a diagram for explaining a hierarchical system of the present invention.

FIG. 8 is a diagram for explaining a hierarchical system of the present invention.

Referring to FIG. 8, a plurality of system structures are arranged to form a tree structure. The term tree structure as used herein refers to a system forming a hierarchical structure, which is configured such that an upper system structure (parent system structure) manages lower system structures (child system structures). For example, a system structure $1001_1$ manages lower system structures $1000_1$-$1000_1$, and a system structure $1002_1$ manages lower system structures $1001_1$-$1000_n$.

Each system structure has a function of reporting performance information about performance of its own to an upper system structure. Each system structure also has a function of detecting, based on performance information reported by the lower system structure, performance drop of the system structure, and a function of performing resource re-allocation optimization processing for the system structures that it manages (including the lower system structures that it manages and the system structure itself) upon the detection of the performance drop. It should be noted that a system structure lying at a bottom layer (e.g., the system structures $1000_1$-$1000_n$ in FIG. 8) may have only the function of reporting performance information to an upper system structure.

Figure 9:
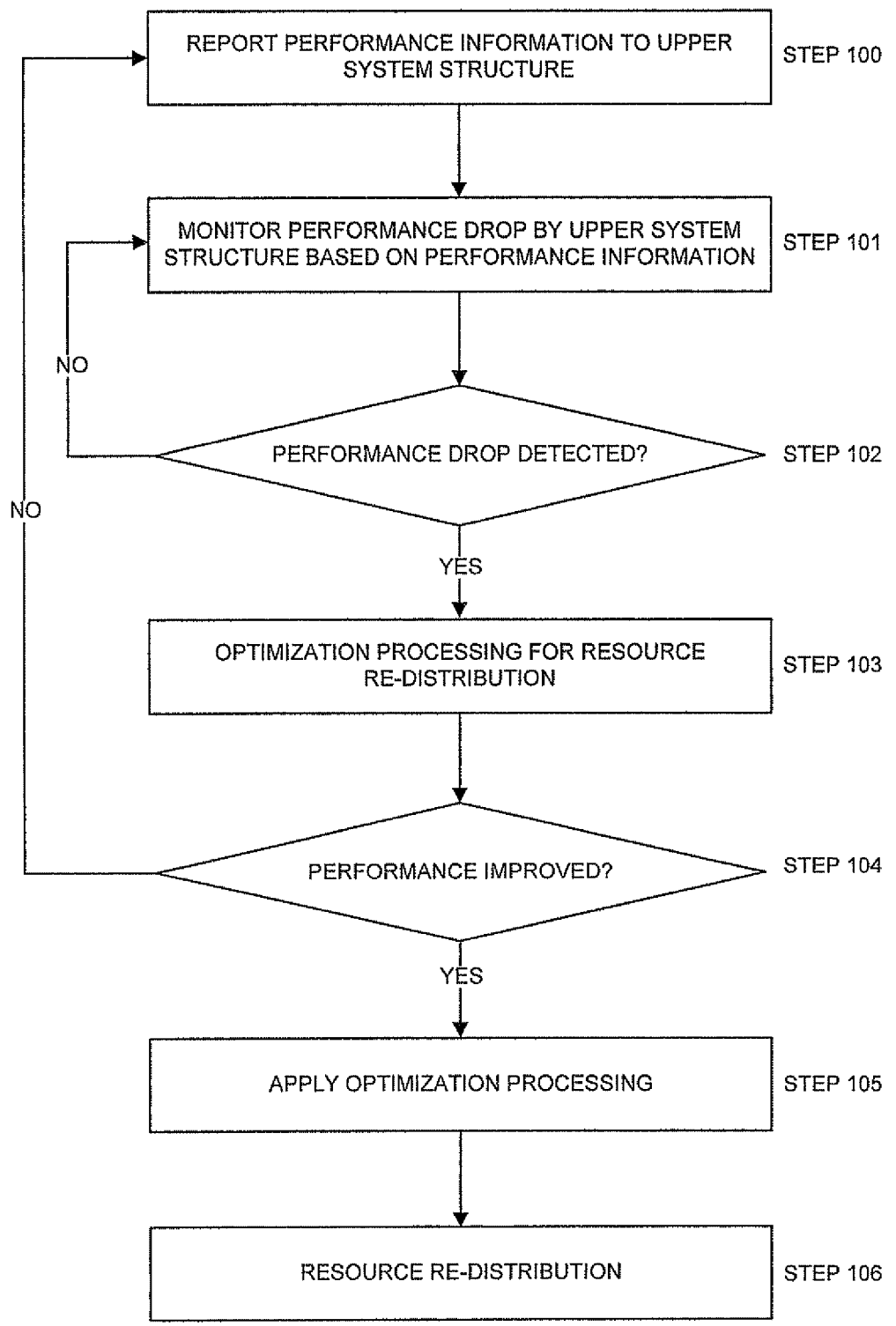
FIG. 9 is a diagram for explaining an operation of the hierarchical system of the present invention.

An operation in such a configuration will now be described with reference to a flow chart shown in FIG. 9.

First, a lower system structure reports its performance information to an upper system structure (Step 100).

The upper system structure detects performance drop of the system structure based on the reported performance information (Step 101). Upon the detection of the performance drop of the system structure (Step 102), the upper system structure performs resource re-allocation optimization processing for the system structures that it manages based on the reported performance information (Step 103).

In a case that performance is improved by the optimization processing within the system structures that it manages (Step 104), the result of optimization is applied to resource control for the lower system structures (Step 105). The lower system structures perform resource re-allocation based on the resource control by the upper system structure (Step 106).

On the other hand, in a case that performance is not improved by the optimization processing within the system structures that it manages (Step 104), the flow goes back to Step 100, and performance information is reported to a still upper system structure (Step 100). The upper system structure that has received the report performs actions of Steps 101-105 as described above.

A specific example of the aforementioned operation will now be described with reference to FIG. 8: Once performance information for the system structure $1000_1$ has been received by the upper system structure $1001_1$ ((1) in FIG. 8) and the upper system structure $1001_1$ has detected performance drop of the system structure $1000_1$, the system structure $1001_1$ performs resource allocation optimization processing for the system structures $1000_1$-$1000_1$ that it manages ((2) in FIG. 8).

In a case that performance of the system structure $1000_1$ is not improved by the optimization by the system structure $1001_1$, this means that performance of the system structure $1001_1$ drops off. Therefore, the system structure $1001_1$ sends its performance information to the upper system structure $1002_1$ ((3) in FIG. 8).

The upper system structure $1002_1$, as with the aforementioned system structure $1001_1$, performs resource allocation optimization processing for the system structures $1001_1$-$1001_n$ that it manages ((4) in FIG. 8). In a case that performance is improved by the optimization processing by the system structure $1002_1$, the result of the optimization is applied to the system structures $1001_1$-$1001_n$ ((5) in FIG. 8).

In response to the resource control, the system structures $1001_1$-$1001_n$ perform resource allocation optimization processing again ((6) in FIG. 8), and the result of the optimization is applied to the system structures $1000_1$-$1000_n$ ((7) in FIG. 8).

Next, the best mode for practicing the present invention will be described in detail with reference to the accompanying drawings.

A tree structure will be described first.

Figure 3:
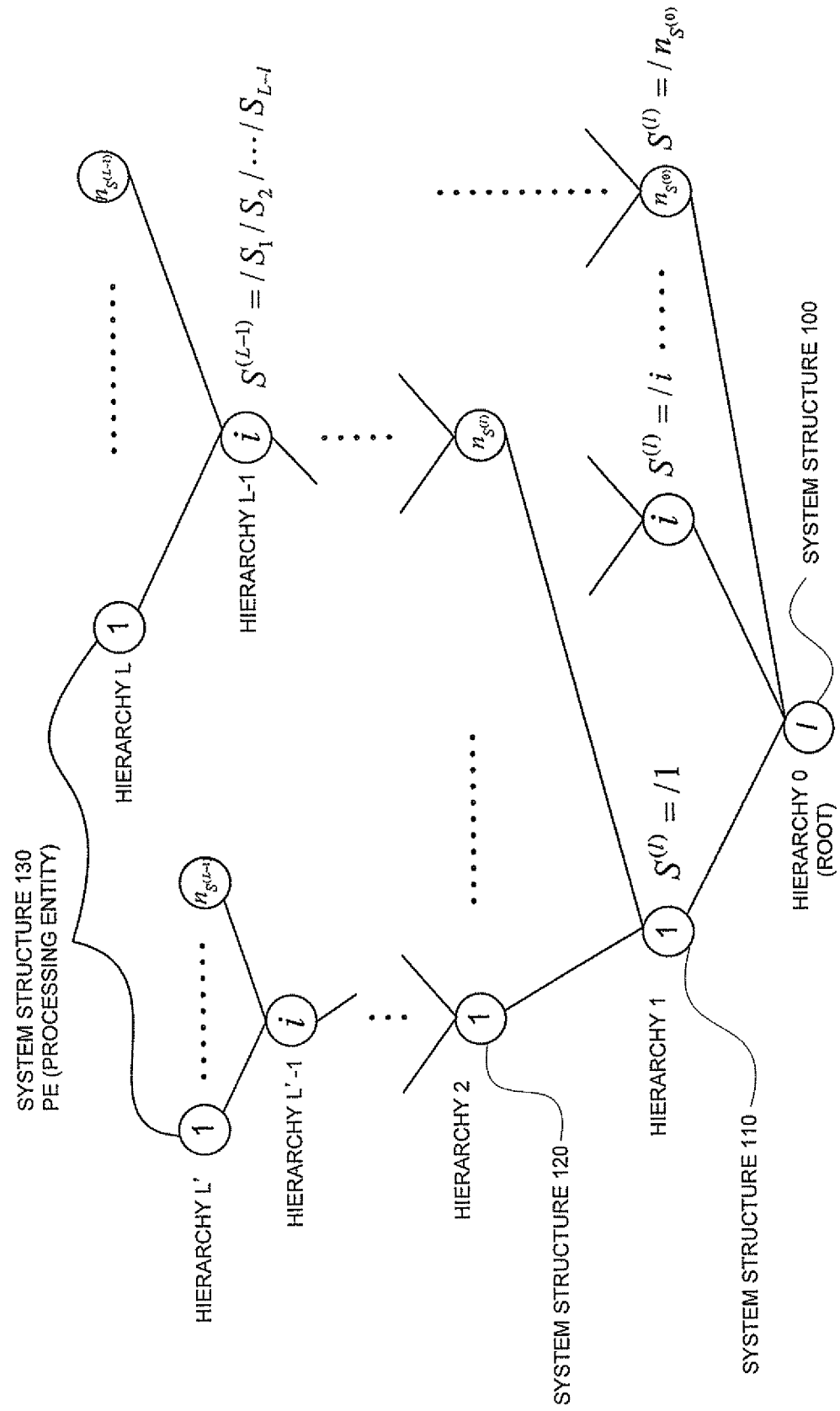
FIG. 3 is a diagram for explaining a first embodiment.
Figure 4:
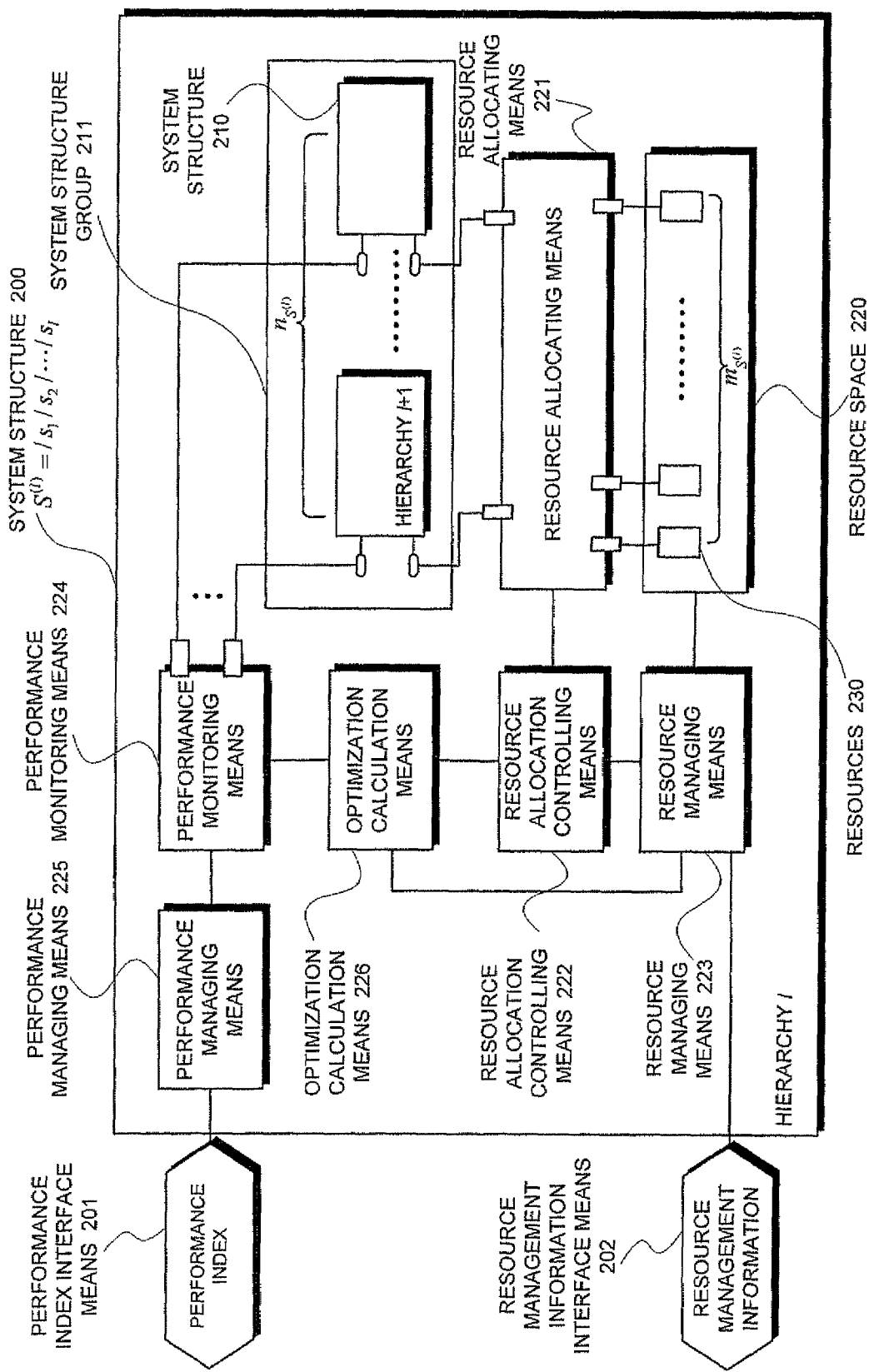
FIG. 4 is a block diagram of the first embodiment.

Referring to FIG. 3, the first embodiment of the present invention is a system having a system structure 200 shown in FIG. 4 constituting a hierarchical structure, in which a system structure 100 at Hierarchy l=0 serving as a root manages a plurality of system structures 110 (Hierarchy l=1) therein, each system structure 110 manages a plurality of system structures 120 (Hierarchy l=2) therein, and so forth, thus forming a tree structure up to the last hierarchy of system structures 130 that have no more system structure to be managed. A system structure 130 will be referred to as a PE (Processing Entity) hereinbelow.

Next, a path will be described.

Nomenclature that allows each system structure present in this tree structure to be uniquely identified within the whole management system involves identification using a path from the root with the index number delimited by "/," as in a system structure at Hierarchy l designated as $S^{(l)}=/s_1/s_2/\ldots/s_l$, meaning that an $s_1$-th system structure at Hierarchy l=1 belongs to a system structure at Hierarchy l=0 serving as a root in the tree structure, an $s_2$-th system structure at Hierarchy l=2 belongs to the $s_1$-th system structure at Hierarchy l=1, ..., and so forth. Moreover, a parent system structure reference operator is defined as "/ ... ". For example, $S^{(l)}/\ldots=/s_1/s_2/\ldots/s_{l-1}/s_l/\ldots=/s_1/s_2/\ldots/s_{l-1}$.

Referring to FIG. 4, a system structure 200 at Hierarchy l (l=0, 1, ...) (path $S^{(l)}=/s_1/s_2/\ldots/s_l$) is comprised of performance index interface means 201, resource management information interface means 202, a system structure group 211 at Hierarchy l+1 contained in and managed by the system structure 200, which group 211 comprising a plurality of system structures 210 each having a structure similar to that of the system structure 200, resource allocating means 221, a resource space 220, a plurality of resources 230 contained in the resource space 220, resource allocation controlling means 222, resource managing means 223, performance monitoring means 224, performance managing means 225, and optimization calculation means 226. The aforementioned PE is similarly considered to be comprised of performance index interface means 201 and resource management information interface means 202.

These means are operated as follows:

The system structure 200 and system structures 210 all have a similar structure, each representing one management system. Each system structure manages system structures contained therein. Such a system structure has the performance index interface means 201 and resource management information interface means 202 as interface with the outside. The system structure manages therein the system structure 210 in the system structure group 211 by inputting information on resources in the resource space of its own through the aforesaid resource management information interface means of the system structure 210 that it manages, and receiving a performance index of that system structure through the performance index interface means.

The performance index interface means 201 is interface for outputting to the outside a performance index of the system structure to which the output performance index belongs, so that the system structure 200 can output its performance index managed by the performance managing means 225 to the outside.

The resource management information interface means 202 is interface for communicating resource management information between the system structure 200 to which the resource management information interface means belongs and an external system structure. It is through this interface that resources can be added, deleted or modified.

The system structure group 211 is a set of system structures 210 at Hierarchy l+1 managed by the system structure 200, which hierarchy is above Hierarchy l of the system structure 200 by one; a system structure group belonging to a system structure $s^{(l)}$ is designated as $H_{s^{(l)}}$, and the number of elements (the number of the system structures 210 to be managed) is designated as $n_{s^{(l)}}$.

The resources 230 refer to those that the system structure 200 possesses, and are designated as $r_i$. The value thereof indicates a representative performance value of a resource, such as, for example, a clock frequency of 1 GHz for a resource of CPU. A plurality of types of resources are generally represented by, for example, a vector $r_i$, where each element thereof expresses one of various resources of the same type whose performance is addible (e.g., a first element represents CPU, a second element represents memory, etc.).

The resource space 220 is a set of the resources 230 that the system structure 200 possesses, and is designated as $R_{s(I)}$, where the number of the elements thereof is equal to the number of resources 230 and is designated as $m_{s(I)}$.

The performance monitoring means 224 is means for monitoring performance indices $Q_{S(I)/i}$ of the system structures 210 $S^{(I)}/i$ (i=1, 2, ..., $n_{s(I)}$) through the performance index interface means of the system structures 210. The performance indices are collectively designated as a performance index group $\{Q_{S(I)/i}\}$.

The resource managing means 223 is means for managing the aforementioned resource space 220 with reference to the resource management information input to the system structure 200, and performing addition, deletion or modification of the resources 230 according to a command. As used herein, an added resource 230 is a resource added from the resource space of a system structure that issues a command of addition via the resource management information interface means 202, whereas deletion refers to addition to the resource space of the managing system structure that has issued a command of deletion of the resource 230.

The optimization calculation means 226 performs optimization calculation of the resource allocation method based on the performance index information and allocated resource information for the managed system structure group 211 from the performance monitoring means 224 and resource managing means 223, respectively. As used herein, optimization refers to adjustment of resources allocated to the system structures so that the value of a performance index group of a system structure group comes as closer to a value predetermined by a management policy as possible.

The resource allocation controlling means 222 is controlling means for issuing a command of a method of allocation of the resources 230 in the resource space 220 to the aforementioned system structures 210 in response to the command by the optimization calculation means 226. Upon completion of resource allocation, it issues an allocation-completed notification to the resource managing means 223, and issues a command to cause a new setup to take effect.

The resource allocating means 221 is means for allocating the resources 230 in the resource space 220 to the system structures 210 in the system structure group 211 in response to a command from the resource allocation controlling means 222. The term resource allocation refers to an operation of sending resource management information to the resource management information interface in the system structure 210 to perform addition of a designated resource 230 in the resource space 220 and deallocation thereof from the system structure 210 in response to addition and deletion commands, respectively.

The performance managing means 225 is means for determining performance of the entire system structure 200 according to a management policy based on information about the performance index group of the system structures 210 managed by the performance monitoring means 224, and outputting it to the outside through the performance index interface means 201.

A PE is a system structure lying at the terminal of the hierarchical structure, and it similarly comprises performance index interface means 201 and resource management information interface means 202, for performing a certain kind of processing such as calculation using resources set up through the resource management information interface means, and outputting a performance index determined by the amount of resources required in the calculation and the set-up amount of resources through the performance index interface means to the outside. The PE has no more hierarchical structure therein. The PE corresponds in an actual system to, for example, a computer such as a server, or a minimal unit to be managed such as a process within a computer.

Figure 5:
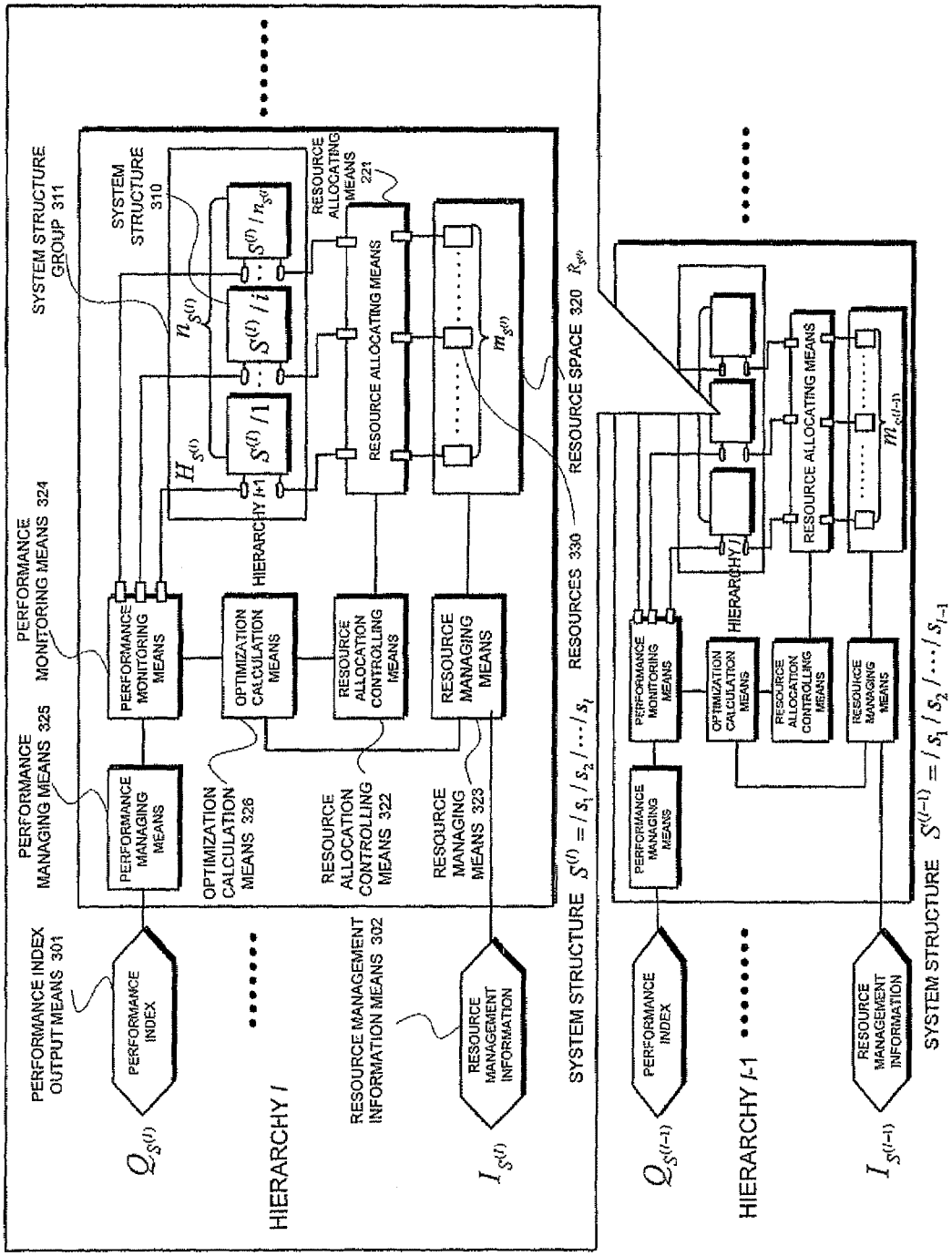
FIG. 5 is a diagram for explaining the first embodiment.

Next, an operation of this embodiment as a whole will be described with reference to FIG. 5 in detail.

First, a resource space of a system structure $S^{(0)}$ currently serving as a root is represented as:

$$R_{S^{(0)}} = \{r_1, r_2, \ldots, r_k, \ldots, r_{n_S^{(0)}}\} = \{r_k\}_{k \in G_S^{(0)}} (G_S^{(0)} = \{1, 2, \ldots, n_S^{(0)}\}),$$

where $G_{s(I)}$ designates a resource index space of the system structure $S^{(0)}$, which is a set of index numbers of resources in the resource space $R_{s(I)}$.

Now assume for simplification that resource allocation does not permit sharing of one resource among system structures, and each resource $r_K$ is a minimal unit that cannot be divided any more. Then, an operation of allocating resources in a resource space $R_{s(I)}$ of a system structure $S^{(I)}$ to system structures $S^{(I)}/i$ (i=1, 2, ..., $n_{s(I)}$) is equivalent to an operation of sub-dividing a resource index space $G^{(I)}$ of the system structure $S^{(I)}$ into a resource index space $G_{s(I)/i}$ in each system structure $S^{(I)}/i$ (i=1, 2, ..., $n_{s(I)}$) in a system structure group $H_{s(I)} = \{S^{(I)}/i\}$, and a reserved resource index space $G_{s(I)/0}$. (It should be noted that the reserved resource index space refers to resources that are stocked without being allocated to any system structure.)

$$G_{S^{(i)}} = \bigcup_i G_{S^{(i)}/i} \equiv G_{S^{(i)}/0} \cup G_{S^{(i)}/1} \cup \ldots \cup G_{S^{(i)}/n_{s^{(i)}}} \quad \text{(EQ. 1)}$$

$$G_{S^{(i)}/i} \cap G_{S^{(i)}/j} = \phi, \text{ (for } i \neq j)$$

so that maximize $$(\{Q_{S^{(i)}/i} = f(G_{S^{(i)}/i})\} \mid \text{management policy})$$

where $\phi$ refers to an empty set, a function Q=f(G) is a performance index function determined by a set G, and maximize $(\{Q_{S(I)/i}\} \mid$ management policy$)$ refers to an operation of maximizing a performance index group $\{Q_{S(I)/i}\}$ under 'management policy.'

That is, a system administrator's aim is formulated as operation/management while searching for an approach (EQ. 1) to distribution of resources (those in the resource space $R_{s(I)}$) of a system (system structure $s^{(I)}$) that he/she manages so that subsystems (system structures $S^{(I)}/i$ (i=1, 2, ..., $n_{s(I)}$) present in the system that he/she manages can attain the maximum performance.

Now an operation of the present invention will be described with reference to a state transition diagram in FIG. 6.

Figure 6:
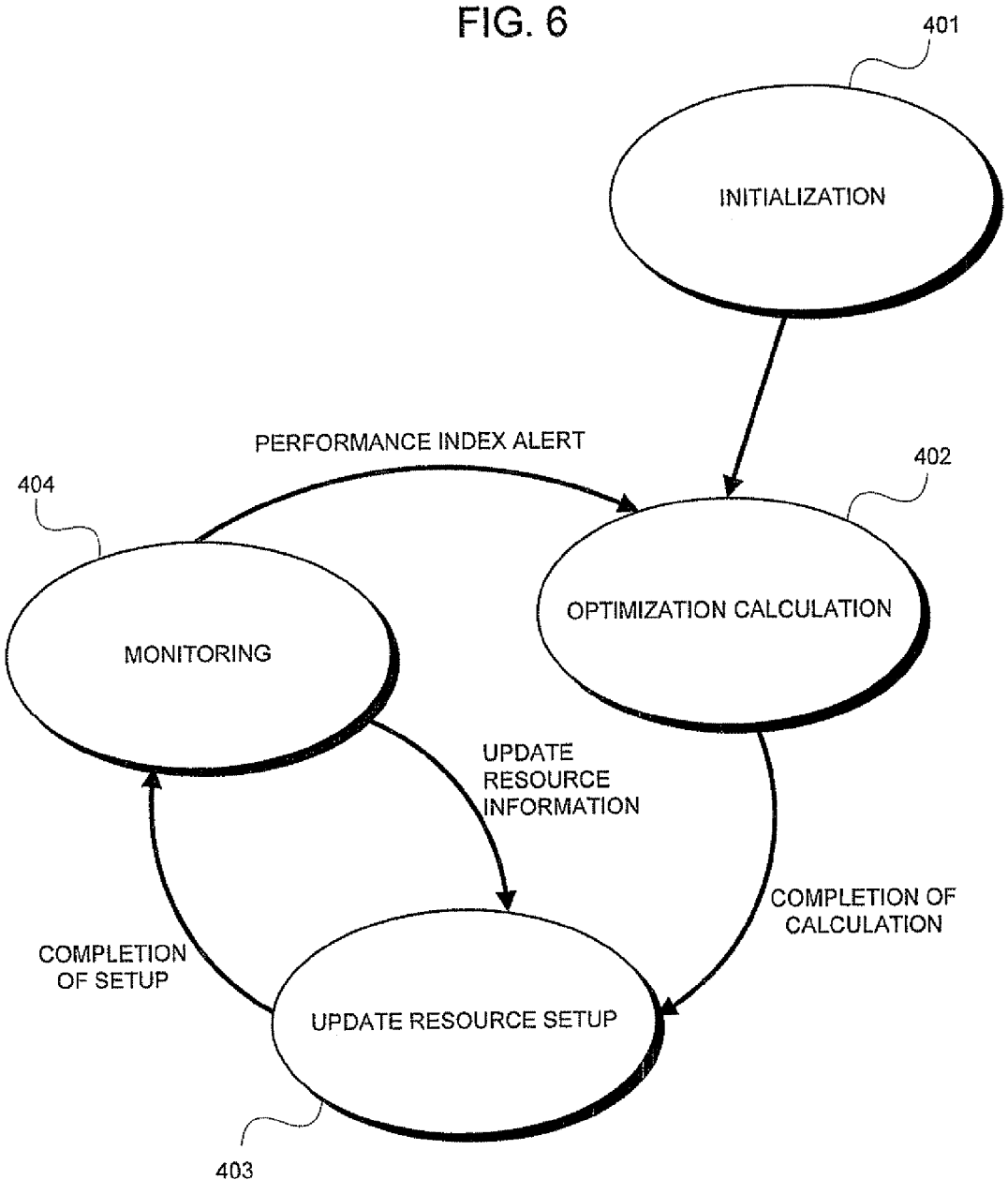
FIG. 6 is a diagram for explaining the first embodiment.

FIG. 6 shows state transition of a certain system structure $S^{(I)}$. The state is generally labeled as initialization 401, monitoring 404, optimization calculation 402, and resource setup/update 403.

Initialization 401 is the start of operation of a system, and at the start of an operational process for a system structure, the state transitions to optimization calculation 402.

Monitoring 404 performs operations including reading a performance index group from a managed system structure group, monitoring the resource management information interface, and generating and outputting a performance index $Q_{S(I)}$ of a system structure $S^{(I)}$.

Optimization calculation 402 performs optimization calculation for resource allocation so that the performance index of the system structure group $H_{S(I)}$ becomes as high as possible. As used herein, optimization calculation refers to an operation of searching for a setup (EQ. 1) so that a resource allocation method for resources in a resource space $R_{S(I)}$ to system structures $S^{(I)}/i$ (i=1, 2, ..., $n_{s(I)}$) in a system structure group $H_{S(I)}$ satisfies a performance index condition for the system structures $S^{(I)}/i$ (i=1, 2, ..., $n_{s(I)}$) as stipulated in a predetermined management policy, referring to the current resource management information and performance index group as described above.

Resource setup/update 403 performs actual resource allocation to the system structures $s^{(I)}/i$ (i=1, 2, ..., $n_{s(I)}$), incorporation of an input via the resource management information interface into the resource management information and the like following the resource allocation instructions specified in the optimization calculation.

Now a sequence from the start of operation to actual operation will be described in detail.

First, system operation is started from initialization 401, in which several kinds of means as shown in FIG. 4 are all enabled and the states of respective means are updated to the latest ones. Moreover, initially set resource allocation is caused to take effect.

Resource allocation is achieved as follows: a system structure $S^{(0)}$ that serves as a root first performs resource allocation:

$$R_{S(0)/i}(t_0) = \left\{ \{r_k\}_{k \in G_{S(0)/i}(t_0)} \middle| \sum_{k \in G_{S(0)/i}(t_0)} r_k = \mu_{S(0)/i}, \right.$$

$$G_{S(0)}(t_0) = \bigcup_{i=0}^{n_{S(I)}} G_{S(0)/i}(t_0),$$

$$\left. G_{S(0)/i}(t_0) \cap G_{S(0)/j}(t_0) = \phi, \text{ (for } i \neq j) \right\} \quad \text{(EQ. 2)}$$

from a resource space constituted by all resources possessed by the whole system:

$$R_{S(0)}(t_0) = \{r_i\}_{i \in GS(0)(i_0)}, G_{S(0)}(t_0) = \{1, 2, \ldots, M\}$$

to system structures $S^{(0)}/i$ (i=1, 2, ..., $n_{s(I)}$). In the equations, $$R_{S(0)/0}(t_0) = \{r_k\}_{k \in G_{S(0)/0}(t_0)}$$

refers to reserved resources, and $\mu_{S(0)/i}$ designates a total amount of resources initially used by the system structure $S^{(0)}/i$ (i=1, 2, ..., $n_{s(I)}$). Thereafter, in general, a system structure $S^{(I)}$ sequentially performs resource allocation:

$$R_{S(0)/i}(t_0) = \left\{ \{r_k\}_{k \in G_{S(0)/i}(t_0)} \middle| \sum_{k \in G_{S(0)/i}(t_0)} r_k = \mu_{S(0)/i}, \right.$$

$$G_{S(0)}(t_0) = \bigcup_{i=0}^{n_{S(I)}} G_{S(0)/i}(t_0),$$

$$\left. G_{S(0)/i}(t_0) \cap G_{S(0)/j}(t_0) = \phi, \text{ (for } i \neq j) \right\} \quad \text{(EQ. 3)}$$

to system structures $S^{(I)}/i$ (i=1, 2, ..., $n_{s(I)}$) in a similar way until the last PE is reached.

As soon as initialization 401 has been completed, the state transitions to optimization calculation 402, and optimization calculation for the system is started. The optimization calculation means 225 acquires resource information that is the latest at that time from the resource managing means 222, acquires performance indices of the system structures $S^{(I)}/i$ (i=1, 2, ..., $n_{s(I)}$) from the performance monitoring means 224, and searches for optimal resource distribution. Techniques for optimization include, for example, a method involving first allocating a resource from reserved resources to a system structure $S^{(I)}/i$ (i=1, 2, ..., $n_{s(I)}$) with poor performance index, and then, allocating a resource of a system structure $S^{(I)}/i$ (i=1, 2, ..., $n_{s(I)}$) with better performance index to a system structure $S^{(I)}/i$ (i=1, 2, ..., $n_{s(I)}$) with poorer performance index to achieve optimization. It is also possible to re-distribute resources so that all system structures $S^{(I)}/i$ (i=1, 2, ..., $n_{s(I)}$) have the same performance index level or to define weighted priority, by stipulating a management policy beforehand.

To find optimal allocation, 'f' described above may be adapted when the form thereof is known; however, since it is unknown in many cases, several means may be contemplated, including, for example, a technique of simply searching from possible combinations of resource allocation, a technique of making feedback-control using a control theory approach, and a technique of making control so that system structures scramble for resources following a certain rule until an equilibrium point is autonomously reached.

Upon completion of the optimization calculation, the state transitions to resource setup/update 403, and the setup is caused to take effect. The effectuation of the setup is achieved by the resource allocation controlling means 222 receiving setup instructions from the optimization calculation means 225 and controlling the resource allocating means 221 as instructed to allocate a resource from the resource space 220 $R_{S(I)/i}$. Once resource allocation has been successfully done, the resource allocation controlling means 222 sends the setup resource allocation information to the resource managing means 223, which then updates information.

Upon completion of update of the resource setup, the state transitions from resource setup/update 403 to monitoring 404. In monitoring 404, the performance monitoring means 224 monitors the performance index group, and the performance managing means 225 creates and updates a performance index $Q_{S(I)}$ for a system structure $S^{(I)}$ from the performance index group kept by the performance monitoring means 224, and outputs it to the outside via the performance index interface means 201.

At that time, to create a performance index $Q_{S(I)}$ of a system structure $S^{(I)}$ from a performance index group, alert generation management is performed according to a pre-stipulated management policy in management of performance indices of all managed system structures $S^{(I)}/i$ (i=1, 2, ..., $n_{s(I)}$).

As used herein, the management policy includes, for example, generating a performance management alert when the state in which any one of performance indices of all managed system structures $S^{(I)}/i$ (i=1, 2, ..., $n_{s(I)}$) drops off below a threshold performance index predetermined by the management policy continues over a certain period of time of management (which will be referred to as alert management policy 1 hereinbelow).

Once the performance management alert has been generated, a performance index $Q_{S(I)}$ of the system structure $S^{(I)}$ is created and updated.

Likewise, state transition from monitoring 404 to optimization calculation 402 occurs when an optimization alert is generated. The optimization alert is also predetermined to follow the aforementioned alert management policy 1, for example. Once the optimization alert has been generated, the state transitions to optimization calculation 402, and optimization processing for the system structure s(1) is started.

When, for example, the state in which the performance indices for system structures $S^{(I)}/i$ (i=1, 2, ..., $n_{s(I)}$) significantly drop off and improvement cannot be expected by optimization continues (which should be declared in the management policy), it is possible to define a resource addition waiting state in which transition to optimization calculation 402 is prohibited, and the original monitoring state 404 is recovered when the aforementioned state is remedied or new information is input to the resource managing means 223 via the resource management information interface means 202 because of resource addition.

Moreover, the resource managing means 223 always monitors a new input from the resource management information interface means 202, and once addition, deletion or modification of resources has been input, the resource managing means 223 updates resource information, and also updates the resource space 220 $R_{S(I)/i}$. After completion of the update, the state transitions to monitoring 404.

Next, optimization processing on the occasion of variation in the amount of used resources wilt be described in detail.

Assume here that a certain system structure $S^{(I)}$ is in the monitoring state 404. Moreover, assume that an optimization alert is generated in a system structure group $H_{S(I)}=\{S^{(I)}/i\}$ that the system structure $S^{(I)}$ manages according to the management policy stipulated by, for example, the aforementioned alert management policy 1 as described above.

At that time, the state transitions from monitoring 404 to optimization 402, and the system structure $S^{(I)}$ performs optimization processing. When the condition of quality degeneration still continues thereafter, the aforementioned performance management alert is generated, and a performance index $Q_{S(I)}$ of the degraded system structure $S^{(I)}$ is created and updated to be output to the outside through the performance index interface means 201; when the performance index for the system structure $S^{(I)}/i$ is improved by the optimization calculation, the optimization alert is cancelled and the ordinary monitoring state is recovered. Thus, when improvement is achieved by optimization only within a certain system structure, optimization processing at a hierarchy closer to the root is precluded.

Next, an operation when update of the resource management information interface occurs will be described in detail.

Assume here that a certain system structure $S^{(I)}$ is in the monitoring state 404. Moreover, assume that update of resource information occurs via the resource management information interface means 202. The types of update considered are addition and deletion. Upon update of resource information, the state transitions to resource setup/update 403, as described above.

(Case of Resource Addition)

In resource management, a newly added resource is registered into reserved resources that are not allocated to any system structure $S^{(I)}/i$, and the state transitions to monitoring 404.

(Case of Resource Deletion)

A designated resource is deleted. At that time, when reserved resources have any resource, new allocation setup is caused to take effect in the system structure $S^{(I)}/i$ from which a resource is deleted insofar as any reserved resource is found. After the resource setup/update has been completed, the state transitions to monitoring 404. A resource is desirably deleted from reserved resources if possible because deletion of a resource from a system structure $S^{(I)}/i$ that is being operated may potentially causes the operation to be stopped.

As viewed from the system structure $S^{(I)}/\ldots$, it is often not concerned with what resources are allocated to the system structure $S^{(I)}/i$, and therefore, as far as the amount of resources is simply concerned, it is possible to select the resource from reserved resources by notifying the system structure $S^{(I)}/\ldots$ beforehand of resources registered in the reserved resources so that a resource is deleted from the reserved resources if possible.

The operation of each system structure $S^{(I)}$ has now been explained. Since these system structures form a tree structure as shown in FIG. 3, a PE of each branch of the tree lying at the farthest hierarchy from the root (the PE will be designated as $S^{(I)}$) uses resources allocated at the start of operation to perform calculation processing, its performance index is output to a parent system structure $S^{(I)}\ldots$ by which it is managed, and the system structure $S^{(I)}/\ldots$ manages performance indices of the system structure group $H_{S(I)}/\ldots$ according to the aforementioned state transition diagram and outputs the performance index $Q_{S(I)}/\ldots$ of the system structure $S^{(I)}/\ldots$ to a system structure $S^{(I)}/\ldots/\ldots$ at a hierarchy immediately lower than the system structure '$S^{(I)}/\ldots$'. Such a hierarchical management structure extends to $S^{(0)}$ serving as a root.

Next, an effect of the present invention based on the aforementioned embodiment will be described.

Now demonstration will be made hereinbelow as to achievement of the scalability merit, management independency merit, and improvement of efficiency in optimization for resource allocation upon variation in the amount of used resources in PE's by applying the present invention as compared with a case in which the present invention is not applied.

First, define the amount of used resources of $S^{(L)}=/S_1/S_2/\ldots/S_L$ that serves as a PE at a time 't' as $X_{S(L)}(t)$, and assume that each PE is allocated with resources of:

$$\mu_{S(L)}^{[0]} \equiv \mu_{S(L)}(t_0) = \sum_{i \in G_{S(L)}} r_i,$$

and a system structure $S^{(I)}$ in general is allocated with resources of:

$$\mu_{S(i)}^{[0]} \equiv \mu_{S(i)}(t_0) = \sum_{i \in G_{S(i)}} r_i$$

In this condition, it can be assumed that a performance index $Q_{S(L)}(t)$ for $S^{(L)}$ is determined by the amount of used resources $X_{S(L)}(t)$ and the amount of allocated resources:

$$\mu_{S(L)}^{[0]}$$

and when an absolute value of the difference thereof reaches or exceeds a certain value, a resource excess state or a resource deficiency state is assumed to occur and a value at which optimization is decided to be required:

$$Q_{S(L)}^{th}$$

is reached.

Specifically, for simplification, $$Q_{S(L)}^{th}$$

is described using a function system of a Heaviside step function $\mu(x)$:

$$Q_{S(L)}(X_{S(L)}(t),\mu_{S(L)}^{[0]}|t)=-u(X_{S(L)}(t)-\mu_{S(L)}^{[0]}-X_{S(L)}^{th}) \quad (EQ.\ 4)$$

so that when:

$$X_{S(L)}^{th} \leq X_{S(L)}(t)-\mu_{S(L)}^{[0]}$$

stands, a resource deficiency error is defined and $Q_{S(L)}(t)=-1$ is output, and when:

$$X_{S(L)}^{th} > X_{S(L)}(t)-\mu_{S(L)}^{[0]}$$

stands, a normal condition is assumed.

Now estimation will be made how frequent the system structure $S^{(L)}=/S_1/S_2/\ldots/S_L$ (PE) becomes a condition in which optimization is required due to resource deficiency.

First, assume that variation in the amount of used resources $X_{S(L)}(t)$ per unit management time follows a normal distribution:

$$N(\mu_{S(L)}^{[0]},\sigma_{S(L)}^2)$$

By transformation of variables:

$$Z_{S(L)} = \frac{X_{S(L)} - \mu_{S(L)}^{[0]}}{\sigma_{S(L)}}, \quad (EQ.\ 5)$$

$Z_{S(L)}$ can be normalized to $N(0, 1)$. At that time, assuming that the amount of used resources that reaches:

$$Q_{S(L)}^{th}=-1$$

is defined as $$X_{S(L)}^{th},$$

then, a probability that:

$$P(X_{S(L)} \geq X_{S(L)}^{th})$$

stands, i.e., a probability:

$$X_{S(L)} \geq X_{S(L)}^{th}$$

becomes:

$$P_{S(L)} = P(X_{S(L)} \geq X_{S(L)}^{th}) = \int_{Z_{S(l)}^{th}}^{\infty} \exp\left(-\frac{z^2}{2}\right)dz = \quad (EQ.\ 6)$$

$$1 - \int_{-\infty}^{Z_{S(l)}^{th}} \exp\left(-\frac{z^2}{2}\right)dz \equiv \Phi^c(Z_{S(l)}^{th})Z_{S(l)}^{th} =$$

$$\frac{X_{S(L)}^{th} - \mu_{S(L)}^{[0]}}{\sigma_{S(L)}} = \alpha \frac{\mu_{S(L)}^{[0]}}{\sigma_{S(L)}} X_{S(L)}^{th} = (1+\alpha)\mu_{S(L)}^{[0]},$$

where:

$$\mu_{S(L)}^{[0]}$$

is not zero, and a threshold:

$$X_{S(L)}^{th}$$

is defined as:

$$X_{S(L)}^{th}=(1+\alpha)\mu_{S(L)}^{[0]},$$

which is an amount of allocated resources:

$$\mu_{S(L)}^{[0]}$$

exceeding by $\alpha$ %.

On the other hand, the system structure $S^{(L-1)}=/S_1/S_2/\ldots/S_{L-1}$ to which this PE belongs has $n_{S(L-1)}$ PE's, and a performance index group for these P's is $\{Q_{S(L)}(t)\}$. Assume that the variation in the amount of used resources of each PE $X_{S(L)}(t)$ is independent and follows the same distribution for all PE's. At that time, a management policy for performance management of the system structure $S^{(L-1)}$ is stipulated as, for example, "if any one member of a performance index group $\{Q_{S(L)}(t)\}$ has degraded performance such that $Q_{S(L)}(t)=-1$, resource allocation optimization processing should be performed again, $$\{\mu_{S(L)}^{[0]}\}$$

should be updated, and control should be made so that the standard deviation in the system structure group $H_{S(L-1)}$:

$$X_{S(l)} - \mu_{S(L)}^{[0]}$$

is minimized."

If $Q_{S(L-1)/i}(t)=0$ stands for all 'i,' $Q_{S(L-1)/i}(t)=0$ is set; if one or more $Q_{S(L)}(t)=-1$ is found, it is regarded that improvement cannot be achieved within the system structure $S^{(L-1)}$, and $Q_{S(L-1)}(t)=-1$ is set.

$$Q_{S(L-1)}(t) = \prod_i \left(1 + Q_{S(L-1)/i}(t)\right) - 1 \quad (EQ.\ 7)$$

Then, a probability $po_{S(L-1)}$ that optimization processing is achieved in the system structure $S_{(L-1)}$ is given by:

$$po_{S(l-1)} = 1 - \prod_i \left(1 - p_{S(l-1)/i}\right). \quad (EQ.\ 8)$$

Moreover, a probability $p_{S(L-1)}$ that a performance index for the system structure $S^{(L-1)}$ becomes $Q_{S(L-1)}(t)=-1$ is a probability that $Q_{S(L-1)}(t)=-1$ holds for any one of system structures (PE's in this case) $S^{(L-1)}/i$ in the system structure group $H_{S(L-1)}$ even after reallocation by optimization, which is a probability that a sum of the amount of used resources of the system structures $S^{(L-1)}/i$ in the system structure group $H_{S(L-1)}$:

$$X_{S(L-1)}(t) = \sum_i X_{S(L-1)/i}(t)$$

exceeds the total amount of resources possessed by the system structure $S^{(L-1)}$.

$$\mu_{S(L-1)}^{[0]} = \sum_i \mu_{S(L-1)/i}^{[0]} = \sum_{k \in G_{S(L-1)}} r_k \text{ by}$$

$$X_{S(L-i)}^{th} = \sum_i X_{S(L-1)/i}^{th}$$

Since from an independency assumption, $X_{S(L-1)}(t)$ follows a normal distribution:

$$N\left(\sum_i \mu^{[0]}_{S(L-1)/i}, \sum_i \sigma^2_{S(L-1)/i}\right),$$

the probability $p_{S(L-1)}$ becomes, $$P_{S(L-1)} = P(X_{S(L-1)} \geq X^{th}_{S(L-1)}) \quad \text{(EQ. 9)}$$

$$= \int_{Z^{th}_{S(L-1)}}^{\infty} \exp\left(-\frac{z^2}{2}\right) dz$$

$$= 1 - \int_{-\infty}^{Z^{th}_{S(L-1)}} \exp\left(-\frac{z^2}{2}\right) dz$$

$$\equiv \Phi^c(Z^{th}_{S(L-1)})$$

$$Z^{th}_{S(L-1)} = \frac{X^{th}_{S(L-1)} - \mu^{[0]}_{S(L-1)}}{\sigma_{S(L-1)}}$$

$$= \alpha \frac{\mu^{[0]}_{S(L-1)}}{\sigma_{S(L-1)}}$$

$$= \sqrt{n_{S(L-1)}} \, \alpha \frac{\mu^{[0]}_{S(L)}}{\sigma_{S(L)}}$$

$$\mu^{[0]}_{S(L-1)} = \sum_i \mu^{[0]}_{S(L-1)/i}$$

$$= n_{S(L-1)} \mu^{[0]}_{S(L)}$$

$$\sigma_{S(L-1)} = \sqrt{\sum_i \sigma^{[0]}_{S(L-1)/i}}$$

$$= \sqrt{n_{S(L-1)}} \, \sigma_{S(L)}$$

from similar transformation of variables.
Since:

$$\frac{\mu^{[0]}_{S(L-1)}}{\sigma_{S(L-1)}} > \frac{\mu^{[0]}_{S(L)}}{\sigma_{S(L)}} \quad \text{(EQ. 10)}$$

stands, the probability $p_{S(L-1)}$ becomes $p_{S(L-1)} < p_{S(L)}$, so that the probability that the performance index for the system structure $S^{(L-1)}$ becomes $Q_{S(L)}(t)=-1$ is significantly smaller than that for the system structure $S^{(L)}$, especially for larger $n_{S(L-1)}$. Moreover, the probability that optimization processing is performed in a system structure $S^{(L-1)}/\ldots=S^{(L-2)}$ by which the system structure $S^{(L-1)}$ is managed is similarly:

$$po_{S(L-2)} = 1 - \prod_i \left(1 - p_{S(L-2)/i}\right). \quad \text{(EQ. 11)}$$

Thereafter, similarly, for a system structure $S^{(l)}$ at Hierarchy $l$ in general, a probability that its performance index becomes $Q_{S(L-1)}(t)=-1$ has the relationship:

$$p_{S(l-1)} < p_{S(l)} \quad \text{(EQ. 12),}$$

and therefore, a lower-hierarchy system structure that is closer to the root has a lower probability of degradation, and moreover, $$po_{S(l-1)} < po_{S(l-1)} \quad \text{(EQ. 13)}$$

stands in general; thus, it is proved that the probability (frequency) that optimization processing is performed per unit management time is smaller for a lower-hierarchy system structure.

Next, the cost for one pass of optimization calculation is estimated as a function with respect to its scale.

As described above, assume now that resource allocation optimization in a certain system structure $S^{(l)}$ is equivalent to a process of, when allocating resources in the resource space $R_{S(l)}$ in $S^{(l)}$ to $n_{S(l)}$ system structures $S^{(l)}/i$ ($i=1, 2, \ldots, n_{S(l)}$) in the system structure group $H_{S(l)}$ and $S^{(l)}/0$ that is regarded as a reserved resource space, finding a method of dividing:

$\Theta$ of a resource index space $G_{S(l)}$ into $n_{S(l)}$ subspaces $G_{S(l)/i}$ ($i=1, 2, \ldots, n_{S(l)}$) so that the standard deviation of:

$$X_{S(l)/i} - \mu^{[0]}_{S(l)/i} \left(\mu^{[0]}_{S(l)/i} = \sum_{k \in G_{S(l)/i}} r_k, (i=1, 2, \ldots, n_{S(l)})\right)$$

is minimized, as given by:

$$\Theta: G_{S(l)} \to \bigcup_{i=0}^{n_{S(l)}} G_{S(l)/i}, \, G_{S(l)/i} \cap G_{S(l)/j} = \phi, \quad \text{(EQ. 14)}$$

$$(i \neq j) \text{ so that } \min(std(X_{S(l)} - \mu^{[0]}_{S(L)}))$$

where std(w) designates a standard deviation of w.

Generally, $X_{S(l)/i}$ is not explicitly known and is estimated from a value of the performance index $Q_{S(l)/i}$. Since the number of searches $\Lambda_{S(l)}$ thereof is a number of possible divisions:

$\Theta$ in allocating from $m_{S(l)}=\#(G_{S(l)})$ elements (where #(A) designates the number of elements in a set A) in the resource index space to $(n_{S(l)}+1)$ resource index subspaces each having $m_{S(l)/i}=\#(G_{S(l)/i})$ elements for $i=0, 1, 2, \ldots, n_{S(l)}$, search of all possibilities at maximum results in:

$$\Lambda_{S(l)} = \quad \text{(EQ. 15)}$$

$$\sum_{[\text{condition}\zeta]} \frac{m_{S(l)}!}{m_{S(l)/0}! m_{S(l)/1}! \ldots m_{S(l)/n_{S(l)}}!} = (n_{S(l)} + 1)^{m_{S(l)}},$$

$$[\text{condition}\zeta]: \sum_{i=0}^{n_{S(l)}} m_{S(l)/i} = m_{S(l)}$$

where the sum in this formulation is calculated for all $[m_{S(l)/0}, m_{S(l)/1}, \ldots, m_{S(l)/n_{S(l)}}]$ that satisfy:

$$[\text{condition}\zeta]: \sum_{i=0}^{n_{S(l)}} m_{S(l)/i} = m_{S(l)}$$

(Proof)
From expansion theorem, $$(x_1 + x_2 + \ldots + x_n)^m = \sum_{\alpha_1+\alpha_2+\ldots+\alpha_n=m} \frac{m!}{\alpha_1!\alpha_2!\ldots\alpha_n!} x_1^{\alpha_1} x_2^{\alpha_2} \ldots x_n^{\alpha_n} \quad \text{(EQ. 16)}$$

stands. Now define $x_1 = x_2 = \ldots x_n = 1$, then $$\sum_{\alpha_1+\alpha_2+\ldots+\alpha_n=m} \frac{m!}{\alpha_1!\alpha_2!\ldots\alpha_n!} x_1^{\alpha_1} x_2^{\alpha_2} \ldots x_n^{\alpha_n} = n^m \quad \text{(EQ. 17)}$$

stands.
(Q. E. D.)

If $X_{S(l)/i}$ is known, the number of searches $\Lambda_{S(l)}$ is:

$$\Lambda_{S(l)} = \frac{m_{S(l)}!}{m_{S(l)/0}! m_{S(l)/1}! \ldots m_{S(l)/n_{S(l)}}!}. \quad \text{(EQ. 18)}$$

In practice, it is not necessary to re-search all resources, and it is possible to reduce the number of searches by, for example, re-doing optimization among those with resource deficiency and those with resource excess; however, a worst case will herein be evaluated throughout for comparison.

Generally, the cost may be considered to be increased in proportion to the number of searches, and the number of searches $\Lambda$ is defined as cost for one pass of optimization calculation.

From the preceding description, the search cost $C_{S(l)}$ in a system structure $S^{(l)}$ per unit management time can be calculated as follows:

$$C_{S(l)} = po_{S(l)} \times \Lambda_{S(l)} \quad \text{(EQ. 19)}$$
$$= \left[1 - \prod_i \left(1 - p_{S(l)/i}\right)\right] (n_{S(l)} + 1)^{m_{S(l)}}.$$

Thus, the search cost $C_{all}$ in the whole system can be roughly calculated as:

$$C_{all} = \sum_{all \, S(l)} C_{S(l)}, \quad \text{(EQ. 20)}$$

where the sum is calculated for all system structures $S^{(l)}$.

As can obviously seen from the form of the function, $C_{S(l)}$ explosively increases as $m_{S(l)}$, $n_{S(l)}$ increase.

Generally, while the number of summed terms in the calculation formula of the search cost $C_{all}$ in the whole system is increased as a larger number of layers are taken to increase the number of system structures $S^{(l)}$, $m_{S(l)}$, $n_{S(l)}$ are on the other hand decreased, and therefore, the rate of decrease of $C_{S(l)}$ is overwhelmingly high as compared thereto, and $C_{all}$ decreases.

As described above, as with the system structure $S^{(l)}$ as shown in FIG. 4, a system is made hierarchical and divided, resource allocation through resource management and control are achieved in a closed form for each $S^{(l)}$, the resulting performance monitoring of the system structure group in an immediately upper layer that it manages is achieved, and the resulting performance index management of its own is achieved, whereby it is possible to perform efficient overall optimization by repeating autonomous optimization within each system structure, with details in management hidden, and without directly seeing PE's that actually consume resources, For example, a configuration in which a certain resource group is consumed by a plurality of PE's has the same optimization cost per unit management time as that in a case in which system structures $S^{(0)}/i$ in a system structure group $H_{S(0)}$ that a root system structure $S^{(0)}$ manages are all PE's according to the present invention, which is given by:

$$C_{all} = po_{S(0)} \times \Lambda_{S(0)} \quad \text{(EQ. 21)}$$
$$= \left[1 - \prod_i \left(1 - p_{S(0)/i}\right)\right] (n_{S(0)} + 1)^{m_{S(0)}}.$$

This may generally be regarded as very high cost as compared with a case in which a plurality of layers are divided as in the present invention. Thus, the present invention especially provides its effect in such an environment that resources are shared among many organizations.

Now the scalability merit, independency, and improvement of efficiency in resource allocation optimization will be described in detail based on the preceding discussion.

For simplification, assume that a whole system contains M resources, and 'a' departments, each of which contains 'b' sections, each of which operates a business application by 'c' computers (PE). Administrators manage respective computers, respectively, a general system administrator manages a service that provides services provided for the departments in combination (e.g., a portal site directed to all employees in a certain company, or to the public), an administrator in each department provides a service therefor (e.g., a personnel service in a human resources department), manages the service so that it correctly works, each section also manages its service (e.g., a work management service), and an administrator of each computer manages its service (e.g., database server) so that it correctly works. Then, in the whole system, there are computers, a total number of which is N=axbxc. Assume that N=axbxc virtual apparatuses are configured according to the conventional virtualization technique, and the departments, sections, PE administrators are supplied with virtual apparatuses as needed. After a certain period of time has elapsed, whereupon load changes as compared with the initial state to require resource reallocation, the general administrator must perform reallocation calculation from performance information reported by the administrators because resource allocation is managed by the general administrator; the optimization z-cost in this condition is:

$$C_c = \left[1 - \prod_{i=1}^{N} \left(1 - p_{S(0)/i}\right)\right] (N + 1)^M \quad \text{(EQ. 22)}$$

per unit management time on the average. In contrast, according to the present invention, the optimization cost is:

$$C_n = \sum_{\text{all } S^{(l)}} \left[1 - \prod_l \left(1 - p_{S^{(l)}/i}\right)\right] \quad \text{(EQ. 23)}$$

$$(n_{S^{(l)}} + 1)^{m_{S^{(l)}}} \sim \left[1 - \prod_{i=1}^{a}\left(1 - p_{S^{(0)}/i}\right)\right](a+1)^M +$$

$$a\left[1 - \prod_{j=1}^{b}\left(1 - p_{S^{(0)}/i/j}\right)\right](b+1)^{M/a} +$$

$$ab\left[1 - \prod_{k=1}^{c}\left(1 - p_{S^{(0)}/i/j/k}\right)\right](c+1)^{M/ab}.$$

It should be noted that resources are roughly assumed to be equally distributed. Comparing these cases, it can be obviously seen that $C_c \gg C_n$ for large N, M. This proves the scalability merit according to the present invention.

Next, independency will be described.

As described above, the resource allocation privileges are given to the general system administrator after all, and it is insufficient to merely divide the privileges and give them to the administrators. It is important in a highly complicated hierarchical structure as in the present invention to manage the overall performance index for all managed systems with details thereof hidden, and only after unrestricted resource allocation privileges for managed systems downstream of the current system and corresponding performance monitoring thereof, and the current system's performance managing means abstracted therefrom are provided, independent management without concern for details of upper or lower hierarchies is allowed, The present invention allows attainment of the overall optimal point by performance management unrestrictedly performed in each system structure while maintaining independency, which would not be achieved by the conventional structure.

Next, improvement of efficiency in optimization will be described.

The optimization cost inherently increases exponentially with the scale. Thus, the conventional method requires very high optimization cost to improve partial performance drop.

In practice, however, the time scale of load variation is different depending upon the scale. The present invention positively uses the fact in optimization, where administrators at each level can perform reconfiguration at a required scale and adapted to the time scale of variation without concern for the overall structure. Thus, it is possible on the whole to achieve reconfiguration for only a required portion and at a required time. This can be proved by the fact that the frequency at which optimization is required is reduced for a hierarchy of a system structure closer to the root as demonstrated by (EQS. 12, 13), and this technique involves solving problems that can be solved by a makeshift of resources within a subsystem, and re-doing resource allocation among subsystems when resource allocation deviates beyond a set value for each whole subsystem, which is a technique suitably adapted to a practical usage environment from the viewpoint of different time scales of variation.

A second embodiment will now be described.

While system structures according to the present invention may be configured in hardware as apparent from the explanation above, it is possible to implement them by a computer program.

Figure 10:
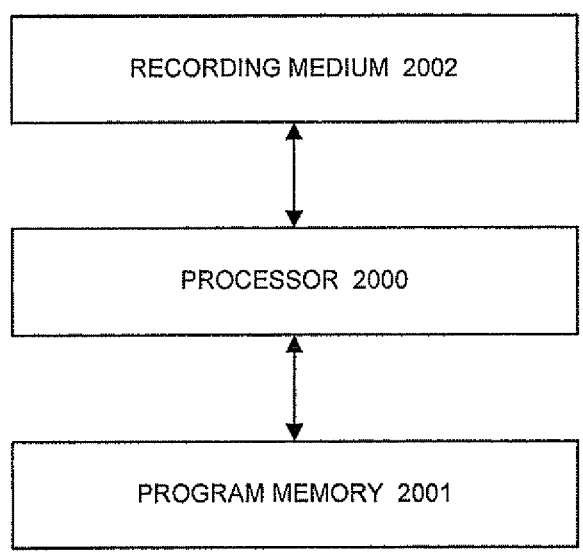
FIG. 10 is a general block configuration diagram of an information processing system in which part of a system structure is implemented.

FIG. 10 is a general block configuration diagram of an information processing system in which part of the system structures is implemented.

The information processing system shown in FIG. 10 is comprised of a processor 2000, a program memory 2001, and a storage medium 2002. The storage medium 2002 may be constructed by separate storage media, or storage regions comprised in the same storage medium. For the storage medium, a RAM or a magnetic storage medium such as a hard disk may be employed.

The program memory 2001 stores therein programs for causing the processor 2000 to execute the processing in the aforementioned resource allocating means 221, resource allocation controlling means 222, resource managing means 223, performance monitoring means 224, performance managing means 225, optimization calculation means 226, performance index interface means 201, and resource management information interface means 202, and the processor 2000 is operated by the programs.

It is thus possible to implement the present invention by computer programs.

It should be noted that not all processing in the resource allocating means 221, resource allocation controlling means 222, resource managing means 223, performance monitoring means 224, performance managing means 225, optimization calculation means 226, performance index interface means 201, and resource management information interface means 202 are necessarily operated by programs, and they may be partially configured by hardware.

Embodiment 1

Figure 7:
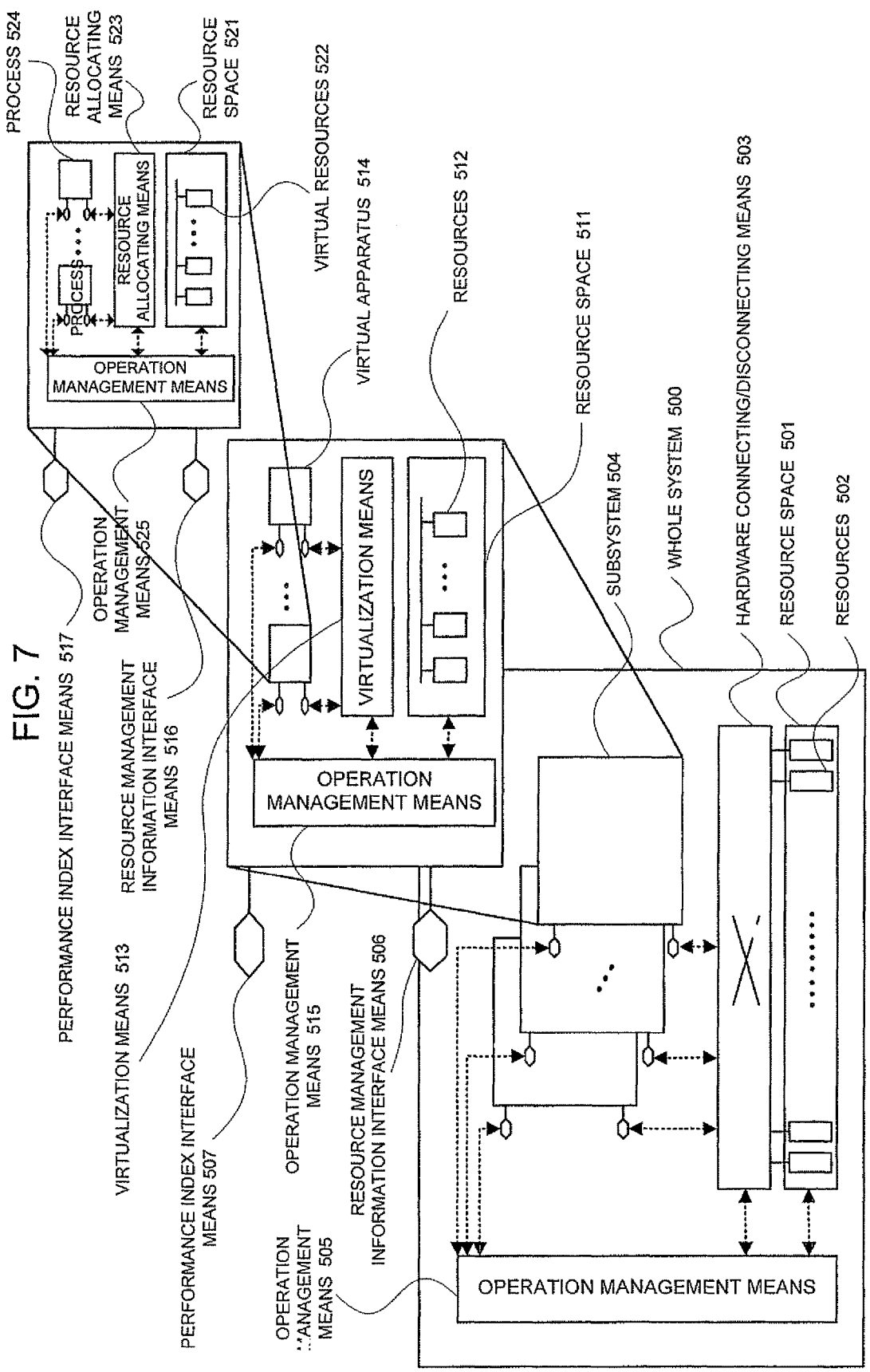
FIG. 7 is a diagram for explaining Example 1.

Consider Embodiment 1 in which, as shown in FIG. 7, a plurality of subsystems 504 are present in a whole system 500, a plurality of virtual apparatuses 514 (computer servers) are present in each subsystem 504, and a plurality of computer processes 524 are present in each virtual apparatus 514.

In the whole system 500, there exist resources 502, a resource space 501 constituted by a set of the resources 502, hardware connecting/disconnecting means 503, and operation management means 505. The resources 502 represent all resources in the system of this embodiment, and it is assumed that a plurality of computer resources present on a housing in which modular service cards are common are connected via hardware connecting/disconnecting means such as a switch.

The hardware connecting/disconnecting means 503 is capable of grouping the resources 502 by connecting them via arbitrary service cards, or of exclusively disconnecting the resources 502 in a group in response to commands from the outside. An example thereof is a VLAN function in an L2 switch that can implement this.

The whole system 500 has its general system administrator who manages the whole system 500 via the operation management means 505. The operation management means 505 has therein several kinds of managing means including the performance index monitoring means, resource managing means, resource allocation controlling means, and performance managing means, required in the present invention as described above. The operation management means 505 is capable monitoring the performance indices of the subsystems 504, collecting resource management information, performing optimization of allocation of the resources 502 to the subsystems, creating a performance index of the whole system 500, and notifying resource addition and the like by generating an alert when performance drops off.

Within each subsystem 504, only the resources 512 in the resource space 511 allocated by the whole system 500 are visible, for which unrestricted resource management/allocation setup is allowed. The subsystem 504 has a similar structure to that of the whole system, and has therein a plurality of virtual apparatuses 514; the operation management means 515 allocates the resources 512 via the virtualization means 513, and collects the performance indices of the virtual apparatuses 514.

The virtualization means 513 is for performing allocation of the resources 512 to the virtual apparatuses 514 in response to a command of the operation management means 515. Examples thereof include a virtual machine monitor (VMM) such as Xen. The virtual apparatus 514 is actually a software process having no physical entity and is a logical apparatus; however, an OS (operating system) or software applications can be installed and run there as in actual computer hardware resources.

A subsystem administrator manages the subsystem 504 via the operation management means 515. The operation management means 515 also has therein several kinds of managing means including the performance index monitoring means, resource managing means, resource allocation controlling means, and performance managing means, required in the present invention as described above. By these means, the performance indices of the virtual apparatuses 514 are monitored, the resources 512 in the resource space 511 are managed, optimization processing is performed as needed referring to the information therefrom, and the result thereof is sent to the virtualization means to achieve resource allocation control. Moreover, a performance index of the subsystem 504 is created and output to the operation management means 505 in the whole system 500 via the performance index interface means 507. Furthermore, the resource space 511 is updated based on the information input via the resource management information interface means 506.

Within each virtual apparatus 514, only the virtual resources 522 in the virtual resource space 521 allocated by the subsystem 504 are visible, for which unrestricted resource management/allocation setup is allowed. The virtual apparatus 514 has a similar structure to that of the whole system 500 or subsystems 504, and has therein a plurality of computer processes 524, and the operation management means 525 allocates the resources 522 via the resource allocating means 523 to collect the performance indices of the computer processes 524.

The resource allocating means 523 is for performing allocation of the virtual resources 522 to the computer processes 524 in response to a command of the operation management means 525. As an example, the resource allocating means 523 may be implemented by a function in the operating system.

The computer process 524 is a software process, serving as a PE in this system, which may be a process of an application that provides a Web service, for example.

A virtual apparatus administrator manages the virtual apparatus 514 via the operation management means 525. The operation management means 525 also has therein several kinds of managing means including the performance index monitoring means, resource managing means, resource allocation controlling means, and performance managing means, required in the present invention as described above. By these means, the performance indices of the computer processes 524 are monitored, the virtual resources 522 in the virtual resource space 521 are managed, optimization processing is performed as needed referring to the information therefrom, and the result thereof is sent to the virtualization means to achieve resource allocation control. Moreover, a performance index of the virtual apparatus 514 is created and output to the operation management means 515 in the subsystem 504 via the performance index interface means 517. Furthermore, the virtual resource space 521 is updated based on the information input via the resource management information interface means 516.

The state of the whole system 500, subsystems 504, and virtual apparatuses 514 transitions according to the aforementioned state transition diagram, and resource allocation optimization processing is performed as needed. According to the present invention, for example, assuming that a whole system is represented by a certain whole organization, a subsystem by a department, a virtual apparatus by a computer apparatus, and a computer process by an application process, the whole organization administers a certain web portal service, each subsystem administers its business service (e.g. a work management service in a human resources department), each virtual apparatus administers its server (e.g. work management database server, web server, etc.), and each computer process administers its required application processes (e.g. daemons such as xinetd or vsftpd for ftp for providing a network function). Each administrator thereof has the performance management indices and resource allocation privileges for system structures in the system that he/she manages, and a performance index abstracted for the entire system that he/she manages is output to a system structure by which it is managed, whereby system operation management by optimization for efficient resource allocation is enabled while keeping high independency.

[Applicability in Industry]

The present invention is applicable to use in configuration and management of an IT/NW system consisting of a plurality of computer apparatuses, and especially, configuration and management of an IT/NW system in a virtualized environment with highly efficient resource utilization by resource sharing.

The invention claimed is:

1. A hierarchical system comprising:
system structures, each serving as a basic unit for managing allocation of resources, are arranged to have a tree structure, said tree structure comprising a first level, a second level directly above said first level, a third level directly above said second level,
  a system structure in the first level comprises:
    a processor comprising hardware configured to
    report performance information for the system structure in the first level to a system structure in the second level that manages the system structure in the first level;
  a system structure in the second level comprises:
    a processor comprising hardware configured to
    detect performance drop of system structures in the first level that the system structure in the second level manages based on the performance information reported from the system structures in the first level,
    perform optimization calculation for reallocating resources to the system structures in the first level that the system structure in the second level manages based on said performance information and resource management information for the system structure in the first level that the system structure in the second level manages, independent of system structures in the third level, when the performance drop is detected, reallocate resources based on the result of the calculation to the system structure in the first level that the system structure in the second level manages when the performance of system structures in the first level that the system structure in the second level manages can be improved with said optimization calculation independent of the system structure in the third level, the optimization calculation being performed on resources with deficiency and resources with excess;

report the performance information of the system structure in the second level to a system structure in the third level that manages the system structure in the second level when the performance of the system structures that the system structure in the second level manages is not improved with said optimization calculation; and manage, based on a result of said optimization calculation from the system structure in the third level that manages the system structure in the second level, the resources allocated by the system structure in the third level by repeating the optimization calculation for resources with deficiency and resources with excess.

2. A hierarchical system according to claim 1 wherein the processor comprising hardware is further configured to create a representative performance index for the system structure in the second level using performance information from system structures in the first level, and thereby, referring to performance of the system structures in the first level from the system structure in the second level.

3. A hierarchical system according to claim 1, wherein the processor comprising hardware is further configured to hide management information for the system structure in the first level from an outside.

4. A hierarchical system characterized in that:

system structures, each serving as a basic unit for managing allocation of resources, are arranged to have a tree structure;

each system structure has resource management information interface means, performance index interface means, resources, resource management means for managing the resources, resource allocation controlling means for controlling resource allocation, performance monitoring means for monitoring performance of the system structures, optimization means for performing optimization calculation for a resource allocation method based on resource management information about the resources from said resource managing means and performance information from said performance monitoring means, resource allocating means for performing resource allocation, and child system structures that an above system structure manages, where a processor comprising hardware is configured to provide the resource management information interface means, the performance index interface means, the resource management means, the resource allocation controlling means, the performance monitoring means, the optimization means and the resource allocating means;

a parent system structure and the child system structure communicate with each other, communicating the resource information via said resource management information interface means and the performance information via said performance index interface means, respectively; and said parent system structure detects performance drop of said child system structures to be managed by said performance monitoring means based on the performance information of the child system structures to be managed, performs optimization processing for allocating the resources to the child system structures to be managed based on the resource information for said child system structures to be managed and the performance information by said optimization means and said resource allocation controlling means, independent of other system structures, when the performance drop is detected, the optimization processing being performed on resources with deficiency and resources with excess, applies a result of said optimization processing to said child system structures to be managed by said resource management information interface means when the performance of said child system structures to be managed can be improved with said optimization processing, and reports the performance information of an above parent system structure to the parent system structure that manages the above parent system structure by said performance index interface means when the performance of the said child system structures to be managed is not improved with said optimization processing.

5. A hierarchical system according to claim 4, wherein said performance monitoring means is configured to create a representative performance index for the system structure to which said operation management means belongs using acquired performance information for the child system structures, and refer to said representative performance index via the performance index interface means.

6. A hierarchical system according to claim 4, wherein said system structures hide detailed management information for the child system structures therein from an outside.

7. A hierarchical system according to claim 4, wherein said resource managing means is configured to update setup of resources with the parent system structure using said resource management information interface means.

8. A management method for a hierarchical system, where system structures, each serving as a basic unit for managing allocation of resources, are arranged to have a tree structure, said tree structure comprising a first level, a second level directly above said first level, a third level directly above said second level, the method comprising:

reporting performance information for a system structure in the first level to a system structure in the second level that manages the system structure in the first level;

detecting performance drop of the system structure in the first level that the system structure in the second level manages based on the performance information reported from the system structure in the first level;

reallocating resources to the system structure in the first level that the system structure in the second level manages based on said performance information and resource management information for the system structure in the first level that the system structure in the second level manages independent of system structures in the third level, when the performance drop is detected;

reallocating resources based on the result of a calculation to the system structure in the first level that the system structure in the second level manages when the performance of system structures in the first level that the system structure in the second level manages can be improved with the reallocation independent of the system structures in the third level, the calculation being performed on resources with deficiency and resources with excess;

reporting performance information of the system structure in the second level to a system structure in the third level that manages the system structure in the second level when the performance of the system structures that the system structure in the second level manages is not improved with the reallocation; and managing resources allocated by the system structure in the third level that manages the system structure in the second level by repeated the calculation for resources with deficiency and with excess.

9. A management method for a hierarchical system according to claim 8 further comprising creating a representative performance index for the system structure in the second level using the reported performance information, and performance of the system structure in the first level is referred to from the system structure in the second level.

10. A management method for a hierarchical system according to claim 8, wherein the system structure in the second level hides management information for a system structure in the first level that it manages from an outside.

11. A computer readable storage device having computer readable program for executing resource management for a hierarchical system in which system structures each serving as a basic unit for managing allocation of resources of each hierarchy are arranged to have a tree structure, characterized in that said program causes an information processing apparatus to execute:

processing for reporting performance information for an above system structure to an upper system structure that manages the above system structure;

detecting performance drop of lower system structures that the above system structure manages based on the performance information reported from the lower system structures that the above system structure manages, performing optimization processing for allocating resources to said lower system structures that the above system structure manages based on said performance information and resource management information for the lower system structures that the above system structure manages, independent of the other system structures, when the performance drop is detected, said optimization processing being performed on resources with deficiency and resources with excess, applying a result of said optimization processing to the lower system structures that the above system structure manages when the performance of the system structures that the above system structure manages can be improved with said optimization processing;

reporting the performance information of the above system structure to the upper system structure that manages the above system structure by said performance information reporting means when the performance of the lower system structures that the above system structure manages is not improved with said optimization processing; and processing for, based on the result of said optimization processing from said upper system structure that manages the above system structure, managing the resources allocated by said upper system structure by repeating the optimization processing for resources with deficiency and resources with excess.

12. The computer readable storage device according to claim 11, wherein said program causes the information processing apparatus to execute:

processing for creating a representative performance index for the lower system structure using the reported performance information; and processing for referring to said representative performance index in response to a request from the upper system structure.

13. The computer readable storage device according to claim 11, wherein said program causes the information processing apparatus to execute:

processing for hiding detailed management information for said lower system structure that the upper system structure manages from an outside.

14. A hierarchical system comprising:

system structures, each serving as a basic unit for managing allocation of resources, are arranged to have a tree structure; and one of the system structures has:

a processor comprising hardware configured to report performance information for an above system structure to an upper system structure that manages the above system structure;

detect performance drop of lower system structures that the above system structure manages based on the performance information reported from the lower system structures that the above system structure manages, perform optimization calculation for reallocating resources to the lower system structures that the above system structure manages based on said performance information and resource management information for the lower system structures that the above system structure manages, independent of other system structures, when the performance drop is detected, reallocate resources based on the result of the calculation to the lower system structures that the above system structure manages when the performance of the system structures that the above system structure manages can be improved with said optimization calculation, the optimization calculation being performed on resources with deficiency and resources with excess, wherein when the performance of the lower system structures that the above system structure manages is not improved with said optimization calculation, the processor comprising hardware reports the performance information of the above system structure to the upper system structure that manages the above system structure; and manage based on the result of said optimization calculation from the upper system structure that manages the above system structure, the resources allocated by said upper system structure by repeating the optimization calculation for resources with deficiency and resources with excess.

15. A management method for a hierarchical system, comprising:

receiving performance information from lower system structures by an above system structure that manages the lower system structures;

detecting performance drop of lower system structures that the above system structure manages based on the performance information reported from the lower system structures that the above system structure manages;

performing optimization calculation for reallocating resources to said lower system structures that the above system structure manages based on said performance information and resource management information for the lower system structures, respectively, that the above system structure manages, independent of other system structures, when the performance drop is detected, the optimization calculation being performed on resources with deficiency and resources with excess;

when the performance of the lower system structures that the above system structure manages can be improved with said optimization calculation, reallocating resources based on the result of the calculation to the lower system structures that the above system structure manages;

when the performance of the lower system structures that the above system structure manages is not improved with said optimization calculation, reporting the performance information of the above system structure to an upper system structure that manages the above system structure; and based on the result of optimizing calculation from the upper system structure that manages the above system structure, managing the resources allocated by said upper system structure by repeating the optimization calculation for resources with deficiency and resources with excess.

16. A computer readable storage device having computer readable program for executing resource management for a hierarchical system where system structures, each serving as a basic unit for managing allocation of resources, are arranged to have a tree structure, said tree structure comprising a first level, a second level directly above said first level, a third level directly above said second level, the program causes an information processing apparatus to execute:

detecting performance drop of a system structure in the first level that the system structure in the second level manages based on performance information reported from the system structure in the first level;

reallocating resources to the system structure in the first level that the system structure in the second level manages based on said performance information and resource management information for the system structure in the first level that the system structure in the second level manages independent of system structures in the third level, when the performance drop is detected;

reallocating resources based on the result of a calculation to the system structure in the first level that the system structure in the second level manages when the performance of system structure in the first level that the system structure in the second level manages can be improved with the reallocation, independent of the system structures in the third level, the calculation being performed on resources with deficiency and resources with excess;

reporting performance information of the system structure in the second level to a system structure in the third level that manages the system structure in the second level when the performance of the system structure that the system structure in the second level manages is not improved with the reallocation; and managing resources allocated by the system structure in the third level that manages the system structure in the second level by repeated the calculation for resources with deficiency and with excess.

\* \* \* \* \*